US011094338B1

(12) United States Patent
Hwang et al.

(10) Patent No.: US 11,094,338 B1
(45) Date of Patent: Aug. 17, 2021

(54) SOT FILM STACK FOR DIFFERENTIAL READER

(71) Applicant: Western Digital Technologies, Inc., San Jose, CA (US)

(72) Inventors: Cherngye Hwang, San Jose, CA (US); Xiaoyong Liu, San Jose, CA (US); Quang Le, San Jose, CA (US); Kuok San Ho, Emerald Hills, CA (US); Hisashi Takano, San Jose, CA (US); Brian R. York, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/029,833

(22) Filed: Sep. 23, 2020

Related U.S. Application Data

(60) Provisional application No. 63/050,020, filed on Jul. 9, 2020.

(51) Int. Cl.
 *G11B 5/39* (2006.01)
 *G11B 5/31* (2006.01)
 *G11B 5/11* (2006.01)

(52) U.S. Cl.
 CPC .............. *G11B 5/315* (2013.01); *G11B 5/11* (2013.01)

(58) Field of Classification Search
 CPC ........ G11B 5/39; G11B 5/3932; G11B 5/3912
 USPC ................... 360/314, 315, 324.12
 See application file for complete search history.

(56) References Cited

U.S. PATENT DOCUMENTS

| 7,016,160 | B2 | 3/2006 | Mao et al. |
| 7,436,632 | B2 | 10/2008 | Li et al. |
| 8,174,799 | B2 | 5/2012 | Hoshiya et al. |
| 9,472,216 | B1 | 10/2016 | Mauri et al. |
| 10,014,012 | B1* | 7/2018 | Song ............. G11B 5/235 |
| 10,210,888 | B1* | 2/2019 | Li ............. H01L 43/04 |
| 10,490,731 | B2 | 11/2019 | Sasaki et al. |

(Continued)

FOREIGN PATENT DOCUMENTS

JP 2021057357 A 4/2021

OTHER PUBLICATIONS

"A colossal breakthrough for topological spintronics," Tokyo Institute of Technology, Jul. 31, 2018, 4 pages, <https://www.titech.ac.jp/english/news/2018/042001.html>.

(Continued)

*Primary Examiner* — Allen T Cao
(74) *Attorney, Agent, or Firm* — Patterson & Sheridan, LLP; Steven H. Versteeg

(57) ABSTRACT

The present disclosure generally relates to spin-orbital torque (SOT) differential reader designs. The SOT differential reader is a multi-terminal device comprising a first seed layer, a first spin hall effect (SHE) layer, a first interlayer, a first free layer, a gap layer, a second seed layer, a second SHE layer, a second free layer, and a second interlayer. The gap layer is disposed between the first SHE layer and the second SHE layer. The materials and dimensions used for the first and second seed layers, the first and second interlayers, and the first and second SHE layers affect the resulting spin hall voltage converted from spin current injected from the first free layer and the second free layer, as well as the ability to tune the first and second SHE layers. Moreover, the SOT differential reader improves reader resolution without decreasing the shield-to-shield spacing (i.e., read-gap).

20 Claims, 13 Drawing Sheets

(56) References Cited

U.S. PATENT DOCUMENTS

| | | | |
|---|---|---|---|
| 10,839,831 B1* | 11/2020 | Nguyen | G11B 5/23 |
| 2015/0287426 A1* | 10/2015 | Mihajlovic | G11B 5/3929 |
| | | | 428/816 |
| 2017/0221506 A1* | 8/2017 | Tan | G11B 5/3163 |
| 2019/0058113 A1 | 2/2019 | Ramaswamy et al. | |

OTHER PUBLICATIONS

Lau et al. "Spin-orbit torque switching without an external field using interlayer exchange coupling," Nature Nanotechnology, vol. 11, Sep. 2016, pp. 758-762, <https://doi.org/10.1038/nnano.2016.84>.

Liu "Spin-orbit Torque Driven Magnetization Switching for Nonvolatile Memory and Beyond," Carnegie Mellon University, May 2020, Thesis, 157 pages, <https://doi.org/10.1184/R1/11933571.v1>, <https://kilthub.cmu.edu/articles/Spinorbit_Torque_Driven_Magnetization_Switching_for_Nonvolatile_Memory_and_Beyond/11933571/files/21908046.pdf>.

* cited by examiner

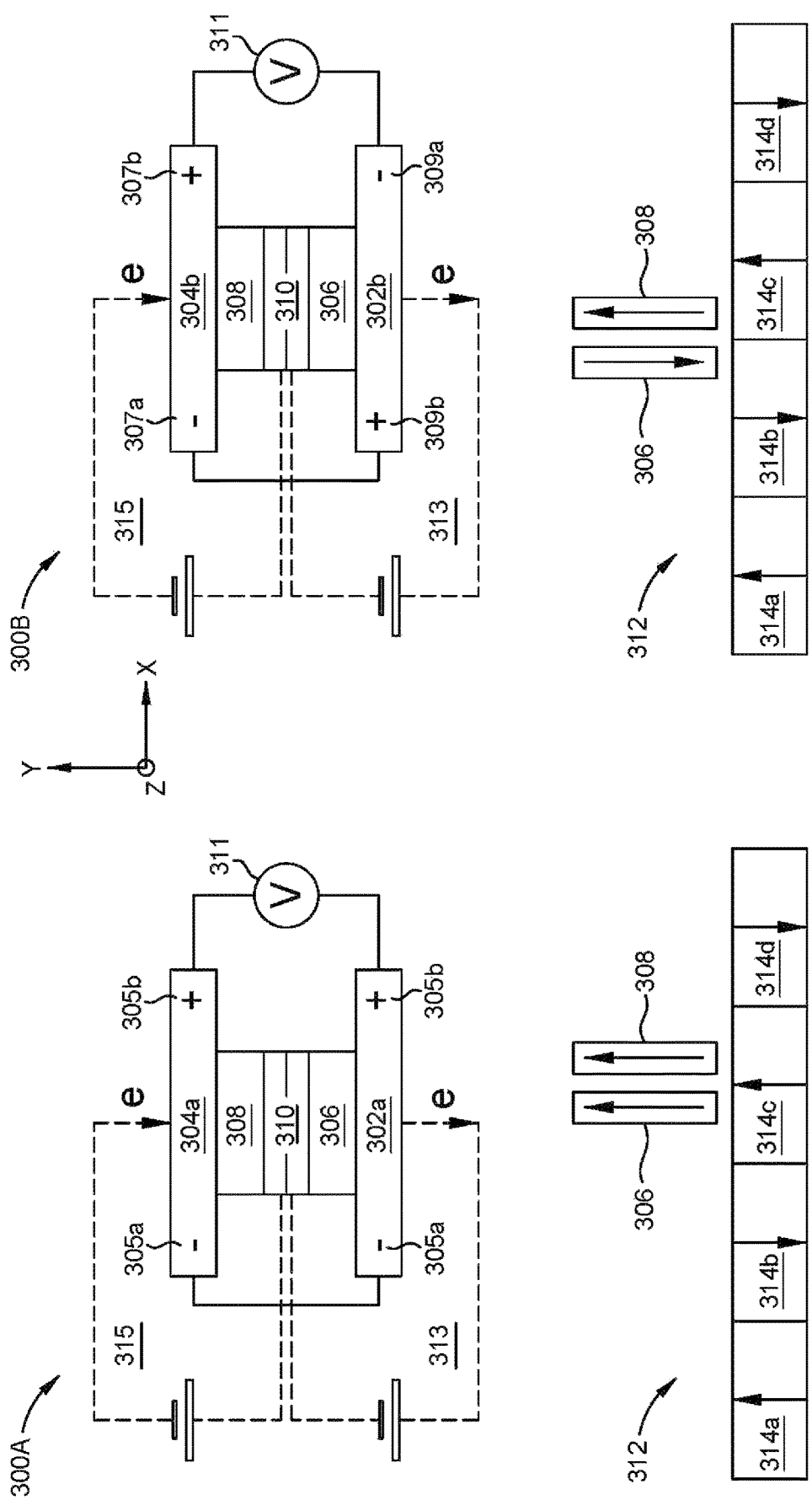

US 11,094,338 B1

SOT FILM STACK FOR DIFFERENTIAL READER

CROSS-REFERENCE TO RELATED APPLICATIONS

This application claims benefit of U.S. provisional patent application Ser. No. 63/050,020, filed Jul. 9, 2020, which is herein incorporated by reference.

BACKGROUND OF THE DISCLOSURE

Field of the Disclosure

Embodiments of the present disclosure generally relate to a read head of a data storage device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track are narrowed. Attempts to achieve increasing requirements of advanced narrow gap reader sensors of read heads to achieve reading of higher recording densities have been proposed utilizing magnetoresistive sensors with free layers comprised of high saturation magnetization materials.

Typical read heads include a read sensor sandwiched between two shields. The shield-to-shield spacing of the two shields plays a crucial role in the resolution of the read sensor. However, conventional read sensors are already minimized to about 25 nm, and cannot be reduced in size much further to decrease the shield-to-shield spacing. Different reader configurations utilizing two read heads between two shields may improve reader resolution without reducing the shield-to-shield spacing (i.e., the read gap). For differential reader configurations, the materials used in the read sensor sandwiched between two shields may cause an unsymmetrical response due to different spin hall angle properties resulting in a baseline shift.

Therefore, there is a need in the art for an improved magnetic read head.

SUMMARY OF THE DISCLOSURE

The present disclosure generally relates to spin-orbital torque (SOT) differential reader designs. The SOT differential reader is a multi-terminal device comprising a first seed layer, a first spin hall effect (SHE) layer, a first interlayer, a first free layer, a gap layer, a second seed layer, a second SHE layer, a second free layer, and a second interlayer. The gap layer is disposed between the first SHE layer and the second SHE layer. The materials and dimensions used for the first and second seed layers, the first and second interlayers, and the first and second SHE layers affect the resulting spin hall voltage converted from spin current injected from the first free layer and the second free layer, as well as the ability to tune the first and second SHE layers. Moreover, the SOT differential reader improves reader resolution without decreasing the shield-to-shield spacing (i.e., read-gap).

In one embodiment, a magnetic recording head comprises a first shield, a second shield, and a spin orbital torque (SOT) differential reader disposed between the first shield and the second shield. The SOT differential reader comprises a silicide seed multilayer disposed over the first shield, a first spin hall effect layer disposed over the silicide seed multilayer, the first spin hall effect layer comprising BiSb or an alloy thereof having a crystalline structure of (012), a first interlayer layer disposed over the first spin hall effect layer, a first free layer disposed over the first interlayer layer, a seed layer disposed over the first free layer, a second free layer disposed over the seed layer, a second interlayer disposed over the second free layer, a second spin hall effect layer disposed over the second interlayer layer, the second spin hall effect layer comprising BiSb or an alloy thereof having a crystalline structure of (001), and a cap layer disposed over the second spin hall effect layer.

In another embodiment, a magnetic recording head comprises a first shield, a second shield, and a spin orbital torque (SOT) differential reader disposed between the first shield and the second shield. The SOT differential reader comprises a silicide seed multilayer disposed over the first shield, a first spin hall effect layer disposed over the silicide seed multilayer, the first spin hall effect layer comprising BiSb or an alloy thereof having a crystalline structure of (012), a first interlayer layer disposed over the first spin hall effect layer, the first interlayer comprising a NiCu layer and a NiFeTa layer, a first free layer disposed over the first interlayer layer, a gap layer disposed over the first free layer, a seed layer disposed over the gap layer, a second free layer disposed over the seed layer, a second interlayer disposed over the second free layer, the second interlayer comprising a NiFeTa layer and a NiAl layer, and a second spin hall effect layer disposed over the second interlayer layer, the second spin hall effect layer comprising BiSb or an alloy thereof having a crystalline structure of (001).

In yet another embodiment, a magnetic recording head comprises a first shield, a second shield, and a spin orbital torque (SOT) differential reader disposed between the first shield and the second shield. The SOT differential reader comprises a silicide seed multilayer disposed over the first shield, the silicide seed multilayer comprising a Si layer, a first Cu layer, a NiFe layer, and a second Cu layer, a first spin hall effect layer disposed over the silicide seed multilayer, the first spin hall effect layer comprising BiSb or an alloy thereof having a crystalline structure of (012), a first interlayer layer disposed over the first spin hall effect layer, the first interlayer comprising a NiCu layer and a NiFeTa layer, a first free layer disposed over the first interlayer layer, a gap layer disposed over the first free layer, a seed layer disposed over the gap layer, the seed layer comprising NiFeTa, a second free layer disposed over the seed layer, a second interlayer disposed over the second free layer, the second interlayer comprising a NiFeTa layer and a NiAl layer, a second spin hall effect layer disposed over the second interlayer layer, the second spin hall effect layer comprising BiSb or an alloy thereof having a crystalline structure of (001), wherein the second spin hall effect layer has a greater thickness and a higher Sb concentration than the first spin hall effect layer, and a cap layer comprising a NiCu layer and a NiFeTa layer disposed over the second spin hall effect layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3E illustrate SOT differential readers, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to spin-orbital torque (SOT) differential reader designs. The SOT differential reader is a multi-terminal device comprising a first seed layer, a first spin hall effect (SHE) layer, a first interlayer, a first free layer, a gap layer, a second seed layer, a second SHE layer, a second free layer, and a second interlayer. The gap layer is disposed between the first SHE layer and the second SHE layer. The materials and dimensions used for the first and second seed layers, the first and second interlayers, and the first and second SHE layers affect the resulting spin hall voltage converted from spin current injected from the first free layer and the second free layer, as well as the ability to tune the first and second SHE layers. Moreover, the SOT differential reader improves reader resolution without decreasing the shield-to-shield spacing (i.e., read-gap).

Figure 1:
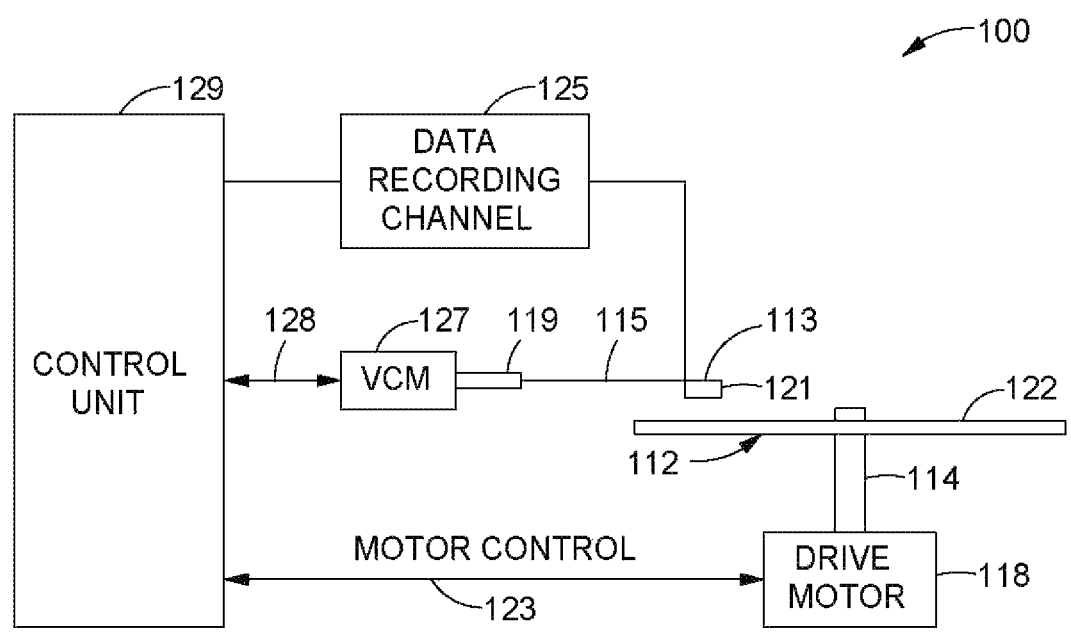
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
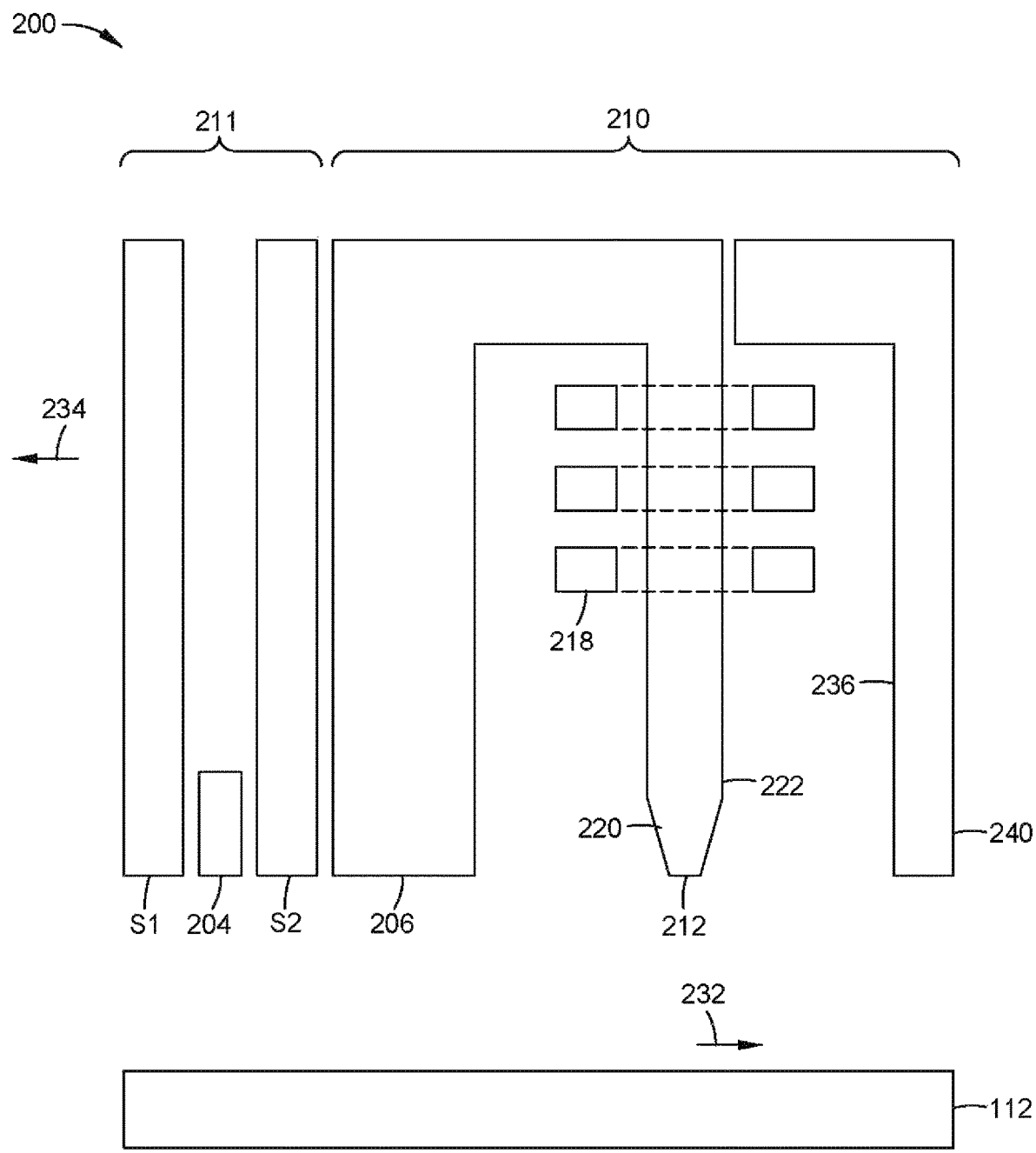
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT differential reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

Figure 3C:
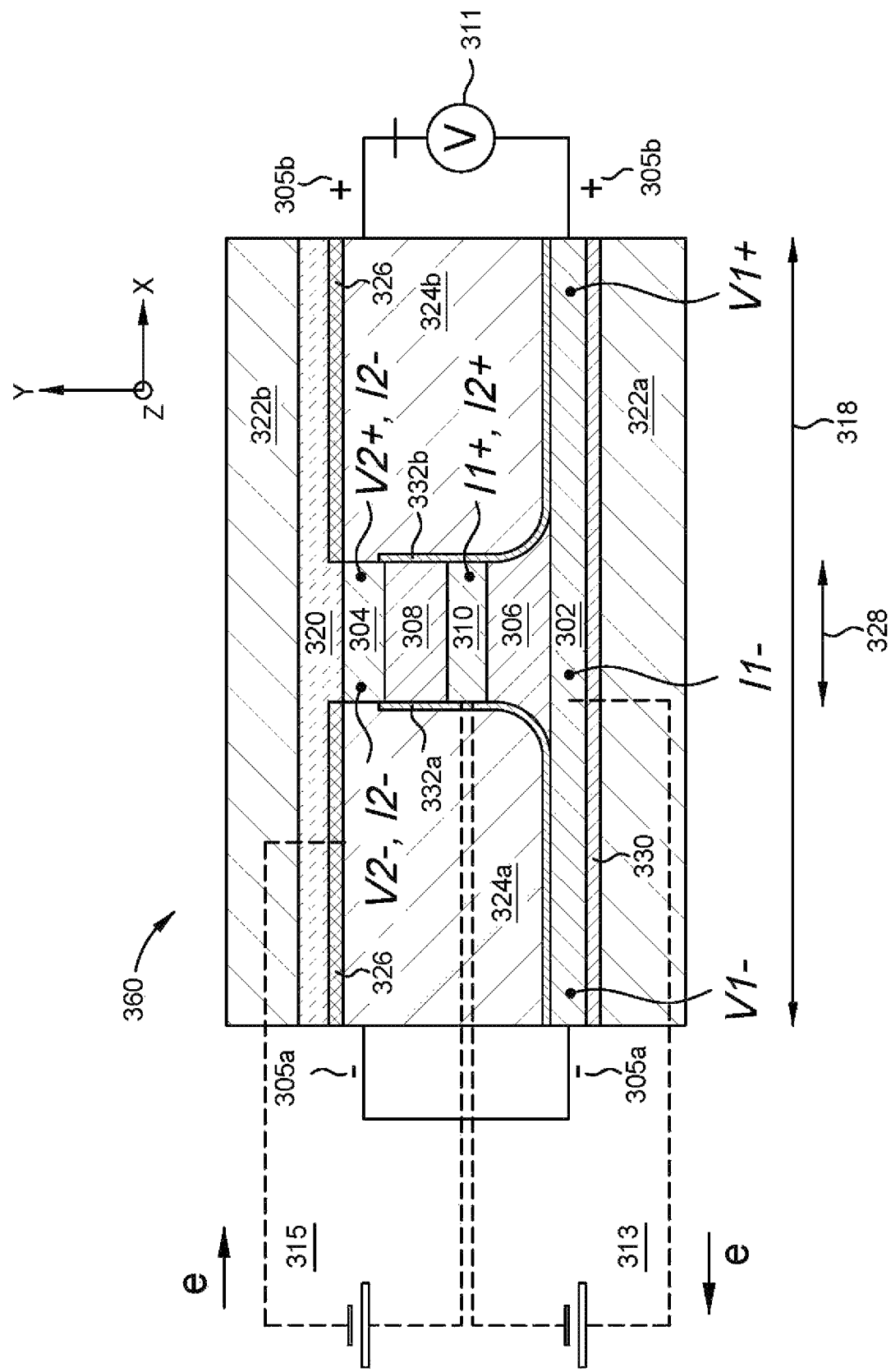

FIGS. 3A-3E illustrate a SOT differential reader, according to various embodiments. FIGS. 3A and 3B illustrate SOT differential readers 300A, 300B, where each of FIGS. 3A and 3B has: (1) a top stack configuration view of the reader and (2) a bottom abstract view showing the positioning of the free layers relative to a magnetic media when the recording head is over the media, with the other layers in the stack configuration omitted. The SOT differential reader 300 may be the SOT differential reader 204 located between the two shields S1 and S2 of FIG. 2. The SOT differential readers 300A, 300B have the same electrical connection configuration. However, the first SOT differential reader 330A and the second SOT differential reader 300B may be positioned perpendicular to different areas of the magnetic media 312. The positioning of the SOT differential readers 300A, 300B about the magnetic media 312 may change the induced voltage polarity of the first spin hall effect layers 302a, 302b and the second spin hall effect layers 304a, 304b.

As shown in the top stack configuration view of FIGS. 3A and 3B, a first free layer (FL) 306 is disposed over a first spin hall effect (SHE) layer 302a, 302b (collectively referred to as first SHE layer 302), a gap layer (GL) 310 disposed over the first FL 306, a second FL 308 disposed over the GL 310, and a second SHE layer 304a, 304b (collectively referred to as second SHE layer 304) disposed over the second FL 308. In the descriptions herein, the plurality of SHE layers may be referred to as a plurality of spin hall layers (SHLs). The SOT differential readers 300A, 300B may each have a stripe height of between about 100 Angstroms to about 400 Angstroms.

In the bottom view of FIGS. 3A and 3B, the first FL 306 and the second FL 308 are shown rotated 90 degrees from the stack configuration view above, and are positioned perpendicularly over the magnetic media 312, where the magnetic media 312 may be the magnetic media 112 of FIG. 1. The first FL 306 and the second FL 308 are parallel with the magnetic field direction of the magnetic media 312. The magnetic media 312 includes a first magnetic field direction, indicated by a first arrow pointing up in bits 314a and 314c, and a second magnetic field direction, indicated by a second arrow pointing down in bits 314b and 314d. The magnetic media 312 further includes a first bit 314a with a first magnetic field direction, a second bit 314b with a second magnetic field direction, a third bit 314c with the first magnetic field direction, and a fourth bit 314d with the second magnetic field direction. While four bits 314a-314d are shown, the magnetic media may have any number of bits.

In the top stack configuration view of FIG. 3A, a positive end or pole 305b of the first SHL 302a is electrically connected to a positive end or pole 305b of the second SHL 304a, and a negative end or pole 305a of the first SHL 302a is electrically connected to a negative end or pole 305a of the second SHL 304a. The voltage polarity of the first SHL 302a and the second SHL 304a (i.e., the positive end or pole 305b and the negative end or pole 305a) depends on the positioning of the first and the second FLs 306, 308 about the magnetic media, as described below. In another embodiment, the voltage polarity of the first SHL 302a and/or the second SHL 304a may be flipped. The listed voltage polarity of the first and the second SHLs 302a, 304a are not intended to be limiting, but to provide an example of a possible embodiment. Referring to the bottom abstract view of FIG. 3A, when the first and second FLs 306, 308, respectively, are both positioned over a single bit of the plurality of bits 314a-314d, such as the third bit 314c, of the magnetic media 312, the magnetic field of the third bit 314c imposes a magnetic force on the first and the second FLs 306, 308. As a result of the magnetic force imposed on the first and the second FLs 306, 308, the magnetic moment of the first and the second FLs 306, 308 are both in the same direction as the magnetic field of the third bit 314c.

In the top stack configuration view of FIG. 3B, a positive end or pole 309b of the first SHL 302b is electrically connected to a negative end or pole 307a of the second SHL 304b, and a negative end or pole 309a of the first SHL 302b is electrically connected to a positive end or pole 307b of the second SHL 304b. The voltage polarity of the first SHL 302b and the second SHL 304b (i.e., the positive end or pole 307b, 309b and the negative end or pole 307a, 309a) depends on the positioning of the first and the second FLs 306, 308 about the magnetic media, as described below. In another embodiment, the voltage polarity of the first SHL 302b and/or the second SHL 304b may be flipped. The listed voltage polarity of the first and the second SHLs 302b, 304b are not intended to be limiting, but to provide an example of a possible embodiment. In the description herein, the position of the negative ends or poles and the positive ends or poles of the SHLs referenced may be flipped. Therefore, embodiments not listed are contemplated and relevant to the current description.

Referring to the bottom abstract view of FIG. 3B, when the first and second FLs 306, 308, respectively, are each positioned over adjacent bits of the plurality of bits 314a-314d, such as the second bit 314b and the third bit 314c, of the magnetic media 312, the magnetic field of the second bit 314b imposes a magnetic force on the first FL 306, and the third bit 314c imposes a magnetic force on the second FL 308, which is opposite to the magnetic force imposed on the first FL 306. As a result of the magnetic force imposed on the first FL 306 and the second FL 308, the magnetic moment of the first FL 306 is in the same direction as the magnetic field of the second bit 314b, and the magnetic moment of the second FL 308 is in the same direction as the magnetic field of the third bit 314c. In FIG. 3B, because the first and the second FLs 306, 308 are located over adjacent bits of the plurality of bits 314a-314d of the magnetic media 312, the first FL 306 has a magnetic field direction opposite of the second FL 308 magnetic field direction.

In FIGS. 3A and 3B, the first SHL 302a, 302b and the second SHL 304a, 304b each comprises the same material and has the same thickness in the y-direction. The first and second SHLs 302a, 302b, 304a, 304b may be formed by a non-magnetic heavy metal material selected from a group that includes Ta, Pt, W, Hf, Bi, and alloys thereof. Additionally, it is to be understood that while Ta, Pt, W, Hf, Bi, and alloys thereof have been exemplified as the materials of the first and the second SHLs 302a, 304a, other materials are contemplated, and the embodiments discussed herein are not limited. For example, BiSb and BiSe may be used as the material for the first and the second SHLs 302, 304. The first and the second SHLs 302, 304 may have a greater width in the x-direction than the first and second FLs 306, 308 and the GL 310. In one embodiment, the first and second SHLs 302, 304 have the same width in the x-direction. In another embodiment, the first and second SHLs 302, 304 have different widths in the x-direction.

In FIG. 3A, the first SHL 302a and the second SHL 304a each generates a lateral voltage signal (i.e., a SHE signal) inside each respective first and second SHLs 302a, 304a. The generated lateral voltage signal may be due to the spin hall effect. The lateral voltage signal polarity may depend on the electron current flow direction and the magnetic orientation of the first and second FLs 306, 308. For example, in the bottom view of FIG. 3A, the first and second FLs 306, 308 are each positioned perpendicularly over the same bit, such as the third bit 314c. The first and second SHLs 302a, 304a have the same SHE voltage polarity, where the side in the negative x-direction is a negative end 305a and the side in the positive x-direction is a positive end 305b.

Furthermore, the negative ends 305a (e.g., the end in the negative x-direction) of the first and the second SHLs 302a, 304a are connected such that the negative ends 305a of the first and the second SHLs 302a, 304a share an equal voltage potential. The reader signal output may be determined by the voltage difference or the differential voltage 311 between the positive ends 305b (e.g., the end in the positive x-direction) of the first and the second SHLs 302a, 304a. Because the first and the second SHLs 302a, 304a each includes the same materials and the same current flow direction, the SHE voltage induced by the first SHL 302a may be equal in both polarity and magnitude to the SHE voltage induced by the second SHL 304a. The differential voltage 311 between the two positive ends 305b may be either cancelled or reduced. The differential voltage 311 may be a net differential output of about zero. A first current 313 travels from the first SHL 302a to the GL 310 and a second current 315 travels from the GL 310 to the second SHL 304a. As such, the SOT differential reader 300A is a multi-terminal device. Because the first and the second SHLs 302a, 304a have the same voltage polarity, the signal output may be greatly reduced.

In the bottom view of FIG. 3B, the first FL 306 and the second FL 308 are located over adjacent bits, such as the first FL 306 being positioned perpendicularly over the second bit 314b and the second FL being positioned perpendicularly over the third bit 314c. The first and the second FLs 306, 308 have different and opposite magnetization. For example, the first SHL 302b has a first SHE voltage, where the side in the negative x-direction is a positive pole 309b and the side in the positive x-direction is a negative pole 309a. Likewise, the second SHL 304b has a second SHE voltage where the side in the negative x-direction is a negative end 307a and the side in the positive x-direction is a positive end 307b.

Furthermore, the positive pole 309b (e.g., the end in the negative x-direction) of the first SHL 302b and the negative end 307a (e.g., the end in the positive x-direction) of the second SHL 304b are connected and share an equal voltage potential. The differential voltage 311 is determined by the difference between the voltage of the positive end 307b of the second SHL 304b and the voltage of the negative pole 309a of the first SHL 302b. Because the induced voltage directions of the first and the second SHLs 302b, 304b are opposite of each other, the differential voltage 311 may effectively double the output signal. A first current 313 travels from the first SHL 302b to the GL 310, and a second current 315 travels from the GL 310 to the second SHL 304b. As such, the SOT differential reader 300B is a multi-terminal device. Because the first and the second SHLs 302b, 304b have opposite voltage directions, the signal output may be effectively doubled or greatly increased.

FIG. 3C illustrates a MFS view of a SOT differential reader 360, according to one embodiment. The SOT differential reader 360 may be the SOT differential reader 300A of FIG. 3A and/or the SOT differential reader 300B of FIG. 3B. Furthermore, the first SHLs 302a, 302b may be the first SHLs 302, and the second SHLs 304a, 304b may be the second SHL 304. In the descriptions herein, the SHLs may be referred to as the SHE layers for exemplary purposes.

The SOT differential reader 360 further includes a first shield 322a disposed below a first insulation layer 330, where the first SHL 302 is disposed over the first insulation layer 330. Furthermore, a second insulation layer 332a is disposed along the top edge of the left side of the SHL 302 (i.e., between the first SHL 302 and a first bias layer 324a) and on the left side of the first FL 306, the GL 310, and the second FL 308 (i.e., adjacent to the first bias layer 324a). A third insulation layer 332b is deposited along the top edge of the right side of the SHL 302 (i.e., between the first SHL 302 and a second bias layer 324b) and on the right side of the first FL 306, the GL 310, and the second FL 308 (i.e., adjacent to the second bias layer 324b). A first bias layer 324a is disposed over the second insulation layer 332a. A second bias layer 324b is disposed over the third insulation layer 332b. A fourth insulation layer 320 is disposed over the first and second bias layers 324a, 324b and the second SHL 304. A second shield 322b is disposed over the fourth insulation layer 320. The first and second bias layers 324a, 324b may comprise a hard bias material or a soft bias material.

The SOT differential reader 360 further comprises a capping layer 326 disposed between a first bias layer 324a, a second bias layer 324b, and the fourth insulation layer 320. The first and second bias layers 324a, 324b may be soft bias layers. The capping layer 326 comprises a material selected from a group of anti-ferromagnetic (AFM) materials that includes IrMn, FeMn, PtMn, and other non-magnetic conducting layers. Furthermore, the capping layer 326 may comprise a group of AFM materials and one or more materials from a group that includes Ta, Ru, or Ti, other non-magnetic materials, and/or their multilayers. The capping layer 326 may be formed by well-known deposition methods, such as sputtering. The capping layer 326 may have a thickness of between about 40 Angstroms to about 150 Angstroms. Additionally, it is to be understood that while IrMn, FeMn, PtMn, Ta, Ru, Ti and their multilayers have been exemplified as the capping layer 326 materials, other materials are contemplated and the embodiments discussed herein are not limited to IrMn, FeMn, PtMn, Ta, Ru, or Ti or their multilayers for the capping layer 326.

The insulation layers 330, 332a, 332b, 320 may be placed in the SOT differential reader 360, such that electrical shorting between the first shield 322a, the first SHL 302, the first FL 306, the GL 310, the second FL 308, the second SHL 304, the second shield 322, the first bias layer 324a, and the second bias layer 324b may be avoided. Suitable materials for the insulation layers 330, 332a, 332b, 320 include dielectric materials such as aluminum oxide, silicon oxide, magnesium oxide, and silicon nitride. The insulation layers 330, 332a, 332b, 320 may be formed by well-known deposition methods such as atomic layer deposition (ALD), physical vapor deposition (PVD), ion bean deposition (IBD), or sputtering. The insulation layers 330, 332a, 332b, 320 may have a thickness of between about 10 Angstroms to about 100 Angstroms.

The first FL 306 and the second FL 308 comprise the same material and have a same thickness in the y-direction. The first and the second FLs 306, 308 have a greater thickness in the y-direction than the first and the second SHLs 302, 304. The first and the second FLs 306, 308 each comprises a CoFe/CoFeB/Ta/NiFe multilayer stack. The CoFe layer may have a thickness of between about 3 Angstroms to about 10 Angstroms. The CoFeB layer may have a thickness of between about 10 Angstroms to about 20 Angstroms. The Ta layer may have a thickness of between about 0.5 Angstroms to about 2 Angstroms. The NiFe layer may have a thickness of between about 3 Angstroms to about 100 Angstroms, such as between about 3 Angstroms to about 10 Angstroms or between about 10 Angstroms and about 100 Angstroms. The first and the second FLs 306, 308 may be formed by well-known deposition methods such as sputtering. Additionally, it is to be understood that while CoFe/CoFeB/Ta/NiFe have been exemplified as the materials of the first and the second FLs 306, 308, other materials are contemplated, and the embodiments discussed herein are not limited to CoFe/CoFeB/Ta/NiFe for the first and the second FLs 306, 308. Furthermore, the previously mentioned dimensions are not intended to be limiting, but to provide an example of a possible embodiment.

The GL 310 has a smaller thickness in the y-direction than the first and the second SHLs 302, 304. The GL 310 may be formed by a non-magnetic conducting material such as Cr with a thickness of between about 10 Angstroms to about 50 Angstroms. In some embodiments, the GL 310 may have a thickness of about 0 Angstroms to about 20 Angstroms. It is to be understood that while Cr is exemplified as the GL 310, other materials are contemplated, and the embodiments discussed herein are not limited to Cr for the GL 310. In some embodiments, insulating materials may be used for the GL 310 material, such as when the GL 310 has a thickness of less than about 1 nm. In one embodiment, the GL 310 includes an electrode to allow for the independent adjustment of the spin hall angle properties of the first SHL 302 and the second SHL 304.

The first shield 322a and the second shield 322b each comprises an electrically conductive material selected from a group that includes Cu, W, Ta, Al, NiFe, CoFe, and alloys thereof. The shield materials may either include NiFe alloy, CoFe alloy, or a combination of NiFe alloy or CoFe alloy with Cu, W, Ta, and Al. The thickness of each of the first shield 322a and the second shield 322b may be between about 20 nm and about 500 nm. Additionally, it is to be understood that while NiFe, CoFe, Cu, W, Ta, Al, and alloys thereof have been exemplified as the first shield 322a and the second shield 322b materials, other materials are contemplated, and the embodiments discussed herein are not limited to NiFe, CoFe, Cu, W, Ta, Al, and alloys thereof for the first shield 322a and the second shield 322b.

In some embodiments, the first and second bias layers 324a, 324b are first and second hard bias layers, respectively. The first hard bias layer and the second hard bias layer may comprise a multilayer structure comprising a seed layer(s) and a bulk layer. In one embodiment, the hard bias layer comprises a Ta seed layer, a Cr or a W seed layer on the Ta seed layer, and a CoPt bulk layer disposed over the Cr or the W seed layer. In some embodiments, the hard bias layer includes a multilayer of the previously mentioned materials. Additionally, it is to be understood that while Ta, W, Cr, and CoPt have been exemplified as the first hard bias layer and the second hard bias layer materials, other materials are contemplated, and the embodiments discussed herein are not limited to Cu, Ta, W, Cr, and CoPt for the first hard bias layer and the second hard bias layer. Furthermore, when the SOT differential reader 360 includes hard bias layers, the AFM/capping layer may not be present in the SOT differential reader.

In some embodiments, the first bias layer 324a and the second bias layer 324b are a first soft bias layer and a second soft bias layer, respectively. The first soft bias layer and the second soft bias layer may comprise a multilayer structure that includes soft magnetic materials. In one embodiment, the soft bias layers comprise a material selected from a group that includes NiFe, CoFe, CoNi, CoFeNi, CoFeB, Co, alloys thereof, and/or their multilayers. Additionally, it is to be understood that while NiFe, CoFe, CoNi, CoFeNi, CoFeB, Co, alloys thereof, and/or their multilayers have been exemplified as the soft bias layer materials, other materials are contemplated, and the embodiments discussed herein are not limited to NiFe, CoFe, CoNi, CoFeNi, CoFeB, Co, alloys thereof, and/or their multilayers for the soft bias layers.

Electrical leads are placed about the first SHL 302, the second SHL 304, and the GL 310. For example, the first SHL 302 includes a first negative voltage terminal (V1−), a first positive voltage terminal (V1+), and a first negative current terminal (I1−). The second SHL 304 includes a second negative voltage terminal (V2−), a second positive voltage terminal (V2+), and a second negative current terminal (I2−) located on either side of the second SHL 304. Furthermore, the GL 310 includes a first positive current terminal (I1+) and a second positive current terminal (I2+). It is to be understood that the illustrated polarity of the voltage terminals of the first and the second SHLs 302, 304 are for exemplary purposes and the voltage polarity of the first and second SHLs 302, 304 may depend on the direction of the current and the positioning of the first and the second FLs 306, 308 relative to the bits, such as the bits 314a-314d, of the magnetic media 312.

Furthermore, the first negative voltage terminal (V1−) and the second negative voltage terminal (V2−) may be electrically shorted together as to provide a common voltage terminal. The differential voltage (e.g., the differential voltage 311) between the first positive voltage terminal (V1+) of the first SHL 302 and the second positive voltage terminal (V2+) of the second SHL 304 is the SOT differential reader signal output. Because the GL 310 includes separate current terminals, the current applied to the first FL 306 and the second FL 308 may be adjusted independently of each other. Therefore, the first FL 306 and the second FL 308 magnetic response may be matched when the first FL 306 and the second FL 308 includes different properties, such as different materials or thicknesses. The current and the voltage directions of FIG. 3A may represent the current and the voltage directions of FIG. 3C. Moreover, while the SOT differential reader 360 of FIG. 3C is shown to have the same electrical leads or voltage terminals as the SOT differential reader 300A of FIG. 3A, the SOT differential reader 360 is not limited to such a configuration. In some embodiments, the electrical leads or voltage terminals of the SOT differential reader 360 may be the same as shown in the SOT differential reader 300B of FIG. 3B.

The first SHL 302 has a first track width 318 that is substantially equal to or less than the width of the first shield 322a, and the second SHL 304 has a second track width 328 that is substantially equal to the width of the stack that includes the first FL 306, the GL 310, and the second FL 308. In some embodiments, the first track width 318 has a width that is less than the width of the first shield 322a. The first track width 318 may be about 200 Angstroms to about 2000 Angstroms wide. The second track width 328 may be about 100 Angstroms to about 400 Angstroms wide.

Figure 3D:
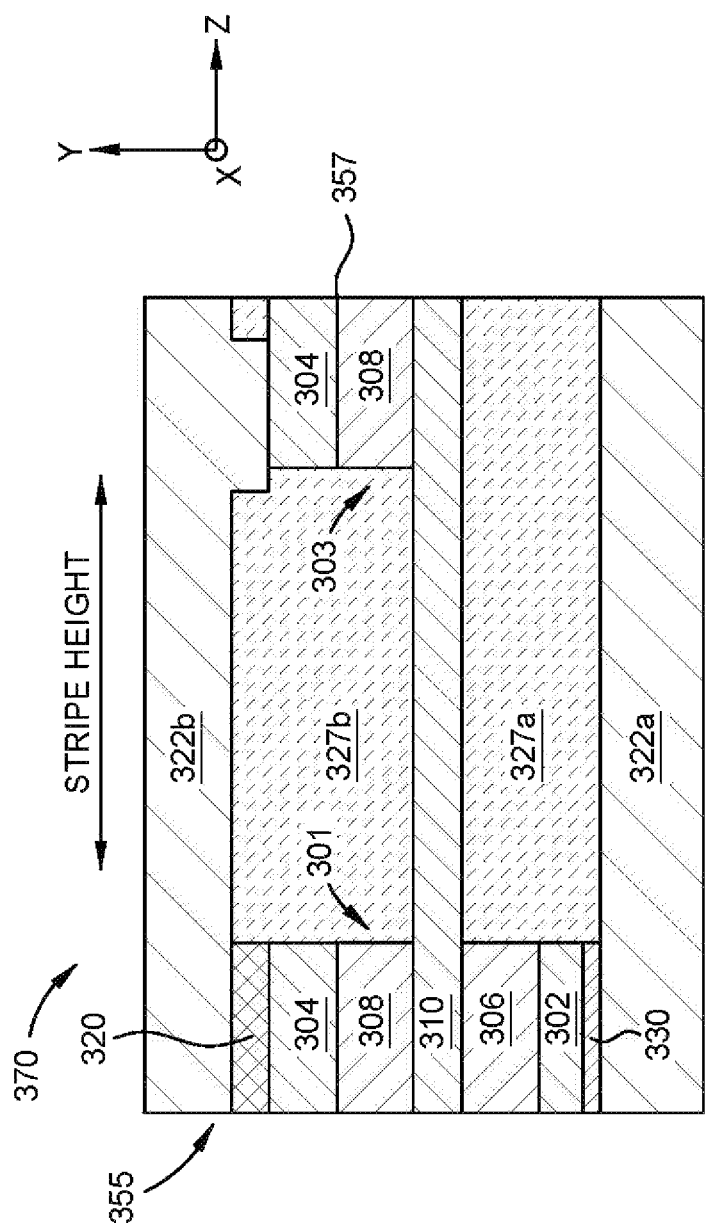

FIG. 3D illustrates a side cross-sectional view of a SOT differential reader 370, according to one embodiment. The SOT differential reader 370 includes a first insulation layer 330 disposed over the first shield 322a, a first SHL 302 disposed over the first insulation layer 330, a first FL 306 disposed over the first SHL 302, a GL 310 disposed over the first FL 306, a second FL 308 disposed over the GL 310, and second SHL 304 disposed over the second FL 308. In the current embodiment, the second FL 308 and the second SHL 304 includes two separated portions or sections, where a first section 301 is adjacent to a media facing surface (MFS) 355 and a second section 303 is disposed over a side 357 opposite to the MFS 355 in the z-direction. The GL 310 extends from the MFS 355 to the side 357 opposite of the MFS 355 and is in contact with the second section 303.

A fourth insulation layer 320 is disposed over the second SHL 304. Furthermore, a fifth insulation layer 327a is disposed between the first shield 322a and the GL 310. A sixth insulation layer 327b is disposed between the GL 310 and the second shield 322b, and between the first section 301 and the second section 303. A second shield 322b is disposed over the fourth insulation layer 320 and the second section of the second SHL 304. The second shield 322b is in contact with the second section of the second SHL 304.

Figure 3E:
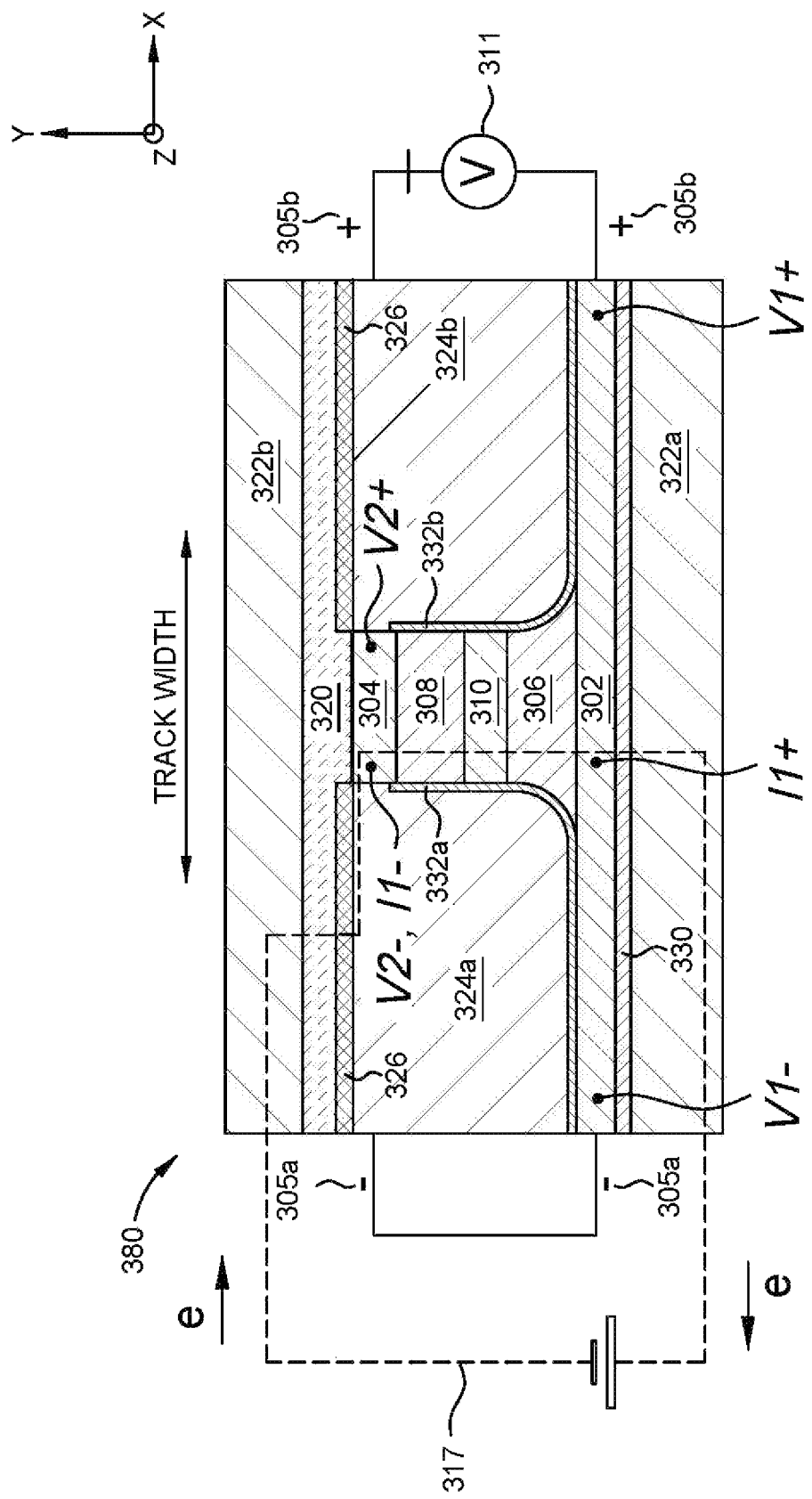

FIG. 3E illustrates a MFS view of a SOT differential reader 380, according to another embodiment. In one embodiment, the SOT differential reader 380 may be the SOT differential reader 300A of FIG. 3A. In another embodiment, the SOT differential reader 380 may have different configurations of the voltage terminals or poles 305a, 305b, such that the voltage terminals match the terminals or poles 307a, 307b, 309a, 309b illustrated in the SOT differential reader 300B of FIG. 3B. Furthermore, the first SHLs 302a, 302b may be the first SHL 302 and the second SHLs 304a, 304b may be the second SHL 304. Aspects of the SOT differential reader 380 are similar to the SOT differential reader 360 of FIG. 3C, and the reference numerals of elements of FIGS. 3C and 3E are consistent to reflect this. However, unlike FIG. 3C, the SOT differential reader 380 includes a single current 317 rather than a first current 313 and a second current 315 as illustrated in FIG. 3C.

Electrical leads are placed about the first SHL 302 and the second SHL 304. In the example shown, the first SHL 302 includes a first negative voltage terminal (V1−), a first positive voltage terminal (V1+), and a first positive current terminal (I1+). It is to be understood that the illustrated polarity of the voltage terminals of the first and second SHLs 302, 304 are for exemplary purposes and the voltage polarity of the first and second SHLs 302, 304 may depend on the direction of the current and the positioning of the first and the second FLs 306, 308 relative to the bits, such as the bits 314a-314d, of the magnetic media 312. As shown, the second SHL 304 includes a first negative current terminal (I1−), a second positive voltage terminal (V2+), and a second negative voltage terminal (V2−).

Furthermore, the first negative voltage terminal (V1−) and the second negative voltage terminal (V2−) may be electrically shorted together as to provide a common voltage terminal. The differential voltage (e.g., the differential voltage 311) between the first positive voltage terminal of the first SHL 302 and the second positive voltage terminal of the second SHL 304 is the SOT differential reader signal output. Furthermore, a current 317 travels from the first positive current terminal (I1+) of the first SHL 302 to the first negative current terminal (I1−) of the second SHL 304. As noted above, while the SOT differential reader 380 of FIG. 3E is shown to have the same electrical leads or voltage terminals as the SOT differential reader 300A of FIG. 3A, the SOT differential reader 380 is not limited to such a configuration. In some embodiments, the electrical leads or voltage terminals of the SOT differential reader 380 may be the same as shown in the SOT differential reader 300B of FIG. 3B.

Figure 4:
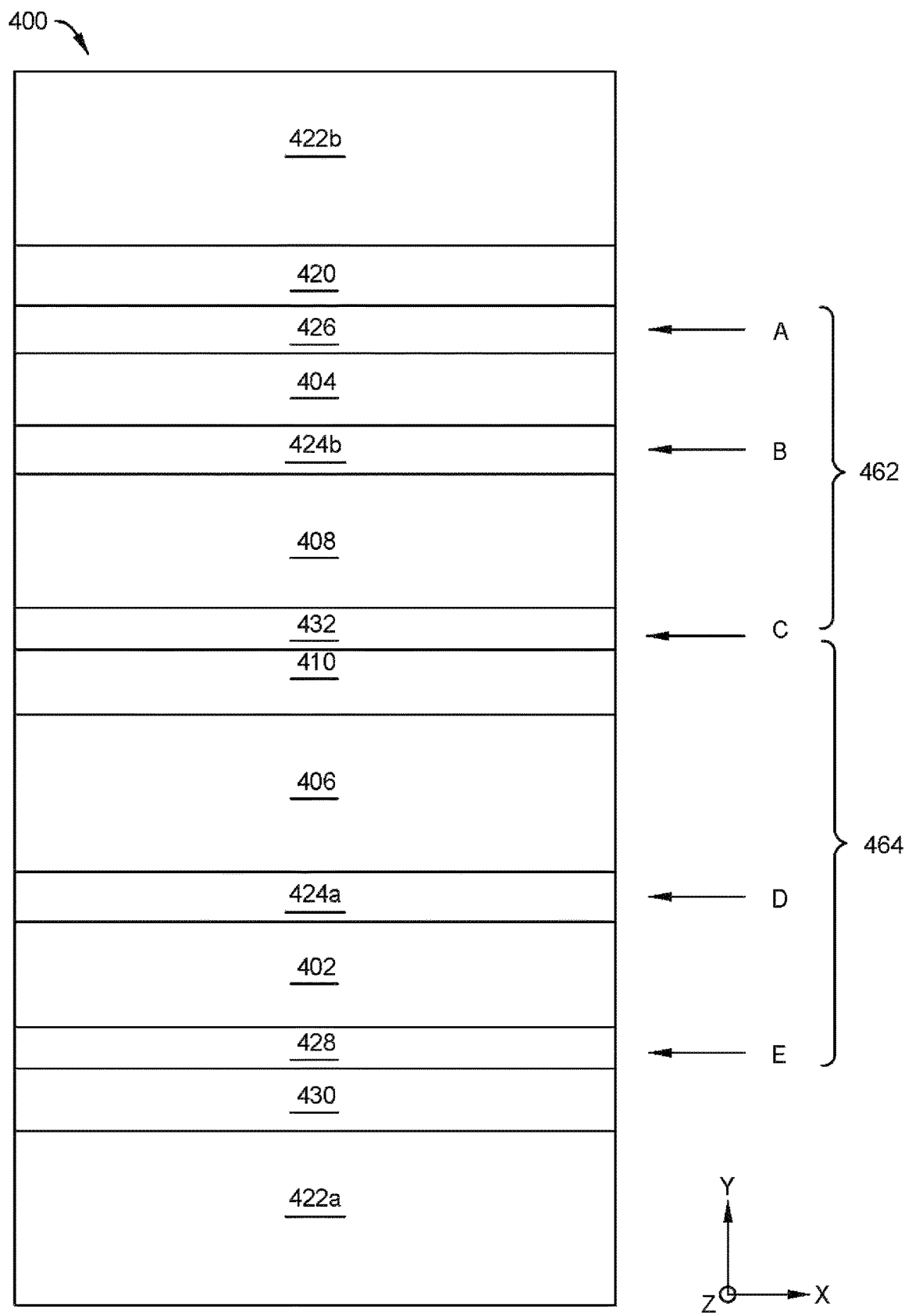
FIG. 4 illustrates a SOT differential reader, according to one embodiment.

FIG. 4 illustrates a MFS view of a SOT differential reader 400, according to one embodiment. Aspects of the SOT differential reader 400 may be similar to the SOT differential readers previously described in FIGS. 3A-3E, and the SOT differential reader 400 may be any one of the SOT differential readers 300A, 300B, 360, 370, 380 of FIGS. 3A-3E, respectively. As such, any materials and/or dimensions of the various layers described in FIGS. 3A-3E may apply to the corresponding layers in FIG. 4.

The SOT differential reader 400 includes a first shield 422a, a first insulation layer 430 disposed over the first shield 422a, a silicide seed multilayer 428 (may be referred to as seed layer 428 or silicide seed layer 428) disposed over the first insulation layer 430, a first SHL 402 disposed over the silicide seed multilayer 428, a first interlayer 424a disposed over the first SHL 402, a first FL 406 is disposed over the first interlayer 424a, and a gap layer 410 is disposed over the first FL 406. The SOT differential reader 400 further includes a seed layer 432 disposed over the gap layer 410, a second FL 408 disposed over the seed layer 432, a second interlayer 424b disposed over the second FL 408, a second SHL 404 disposed over the second interlayer 424b, a SHL capping layer 426 disposed over the second SHL 404, a second insulation layer 420 disposed over the SHL capping layer 426, and a second shield 422b disposed over the second insulation layer 420. In some embodiments, an AFM/capping layer may be disposed on the SHL capping layer. In such embodiments, the AFM/capping layer may comprise a group of AFM materials and one or more materials from a group that includes IrMn, FeMn, PtMn, Ta, Ru, or Ti, other non-magnetic materials, and/or their multilayers.

As discussed further below, the thicknesses of the first interlayer 424a, the second interlayer 424b, the silicide seed multilayer 428, and the seed layer 432 are each selected to vary and control the spacing between the first SHL 402 and the second SHL 404. Controlling the spacing between the first and second SHLs 402, 404 enables the amplitude of the first and second SHLs 402, 404 to be tuned and matched.

The silicide seed multilayer 428 may be referred to as the 'E' layer, the first interlayer 424a may be referred to as the 'D' layer, the seed layer 432 may be referred to as the 'C' layer, the second interlayer 424b may be referred to as the 'B' layer, and the SHL capping layer 426 may be referred to as the 'A' layer. The SOT differential reader 400 may be split into a first section 462 and a second section 464, where the first section 462 of the SOT differential reader 400 may include the layers between the "A" layer and the "C" layer, and the second section 464 of the SOT differential reader 400 may include the layers between the 'C' layer and the 'E' layer. The resulting SHE signal output from the first SHL 402 and the second SHL 404 may depend on the characteristics that each section 462, 464 includes, such as current, voltage, the materials used, and the layer thicknesses.

The first shield 422a and the second shield 422b each comprises an electrically conductive material selected from a group that includes Cu, W, Ta, Al, NiFe, CoFe, and alloys thereof. The shield materials may either include NiFe alloy, CoFe alloy, or a combination of NiFe alloy or CoFe alloy with Cu, W, Ta, and Al. The thickness of each of the first shield 422a and the second shield 422b may be between about 20 nm and about 500 nm. Additionally, it is to be understood that while NiFe, CoFe, Cu, W, Ta, Al, and alloys thereof have been exemplified as the first shield 422a and the second shield 422b materials, other materials are contemplated, and the embodiments discussed herein are not limited to NiFe, CoFe, Cu, W, Ta, Al, and alloys thereof for the first shield 422a and the second shield 422b.

Suitable materials for the insulation layers 420, 430 include dielectric materials such as aluminum oxide, silicon oxide, magnesium oxide, and silicon nitride. The insulation layers 420, 430 may be formed by well-known deposition methods such as atomic layer deposition (ALD), physical vapor deposition (PVD), ion bean deposition (IBD), or sputtering. The insulation layers 420, 430 may have a thickness of between about 10 Angstroms and about 100 Angstroms.

The SHL capping layer 426 comprises a NiCu/NiFeTa multilayer stack. The NiCu layer may have a thickness between about 5 Angstroms to about 10 Angstroms. The NiFeTa layer may have a thickness between about 10 Angstroms to about 20 Angstroms. The listed dimensions are not intended to be limiting, but provide an example of a possible embodiment. The SHL capping layer 426 may be formed by well-known deposition methods such as ALD, PVD, IBD, or sputtering. Additionally it is to be understood that while NiCu/NiFeTa have been exemplified as the materials of the multilayer stack of the SHL capping layer 426, other materials are contemplated, and the embodiments discussed herein are not limited to NiCu/NiFeTa for the SHL capping layer 426. The SHL capping layer 426 may aid in producing the specified texture (i.e., the (001) crystalline structure).

The first interlayer 424a comprises a NiCu/NiFeTa multilayer stack. The NiCu layer may have a thickness between about 2 Angstroms to about 12 Angstroms, such as about 2 Angstroms to about 4 Angstroms. The NiFeTa layer may have a thickness between about 5 Angstroms to about 15 Angstroms. The listed dimensions are not intended to be limiting, but provide an example of a possible embodiment. The first interlayer 424a may be formed by well-known deposition methods such as ALD, PVD, IBD, or sputtering. Additionally it is to be understood that while NiCu/NiFeTa have been exemplified as the materials of the multilayer stack of the first interlayer 424a, other materials are contemplated, and the embodiments discussed herein are not limited to NiCu/NiFeTa for the first interlayer 424a.

The second interlayer 424b comprises a NiFeTa/NiAl multilayer stack. The NiFeTa layer may have a thickness between about 5 Angstroms to about 15 Angstroms. The NiAl layer may have a thickness between about 5 Angstroms to about 20 Angstroms. The listed dimensions are not intended to be limiting, but provide an example of a possible embodiment. The second interlayer 424b may be formed by well-known deposition methods such as ALD, PVD, IBD, or sputtering. Additionally it is to be understood that while NiFeTa/NiAl have been exemplified as the materials of the multilayer stack of the second interlayer 424b, other materials are contemplated, and the embodiments discussed herein are not limited to NiFeTa/NiAl for the second interlayer 424b.

In one embodiment, the first FL 406 and the second FL 408 comprise the same material and have a same thickness in the y-direction. In another embodiment, the first FL 406 and the second FL 408 comprise different materials have a different thickness in the y-direction. In yet another embodiment, the first FL 406 and the second FL 408 comprise the same or different materials and the have the same or different thicknesses in the y-direction. The first and the second FLs 406, 408 have a greater thickness in the y-direction than the first and the second SHLs 402, 404. The first and the second FLs 406, 408 each includes a CoFe/CoFeB/Ta/NiFe multilayer stack. The CoFe layer may have a thickness of between about 3 Angstroms to about 10 Angstroms. The CoFeB layer may have a thickness of between about 10 Angstroms to about 20 Angstroms. The Ta layer may have a thickness of between about 0.5 Angstroms to about 2 Angstroms. The NiFe layer may have a thickness of between about 3 Angstroms to about 100 Angstroms, such as between about 3 Angstroms and about 10 Angstroms or between about 10 Angstroms and about 100 Angstroms.

The first and the second FLs 406, 408 may be formed by well-known deposition methods such as sputtering. Additionally, it is to be understood that while CoFe/CoFeB/Ta/NiFe have been exemplified as the materials of the first and the second FLs 406, 408, other materials are contemplated, and the embodiments discussed herein are not limited to CoFe/CoFeB/Ta/NiFe for the first and the second FLs 406, 408. Furthermore, the previously mentioned dimensions are not intended to be limiting, but to provide an example of a possible embodiment.

The silicide seed multilayer 428 comprises a Si/Cu/NiFe/Cu multilayer stack. The Si layer may have a thickness of about 16 Angstroms. The Cu layers may have a thickness of about 1 Angstrom. The NiFe layer may have a thickness of about 8 Angstroms. The listed dimensions are not intended to be limiting, but provide an example of a possible embodiment. The silicide seed multilayer 428 may be formed by well-known deposition methods such as ALD, PVD, IBD, or sputtering. Additionally it is to be understood that while Si/Cu/NiFe/Cu have been exemplified as the materials of the multilayer stack of the silicide seed multilayer 428, other materials are contemplated, and the embodiments discussed herein are not limited to Si/Cu/NiFe/Cu for the silicide seed multilayer 428. The silicide seed multilayer 428 thickness may be adjusted to tune the first SHL 402, such that the resulting spin current of the first FL 406 may be matched to the spin current of the second FL 408.

The seed layer 432 comprises a magnetic material or compound such as NiFeTa. A seed layer 432 comprising NiFeTa may have a thickness of between about 5 Angstroms to about 15 Angstroms. The listed dimensions are not intended to be limiting, but provide an example of a possible embodiment. The seed layer 432 may be formed by well-known deposition methods such as ALD, PVD, IBD, or sputtering. Additionally it is to be understood that while NiFeTa have been exemplified as the materials of the multilayer stack of the seed layer 432, other materials are contemplated, and the embodiments discussed herein are not limited to NiFeTa for the seed layer 432. The seed layer 432 thickness may be adjusted to tune the second SHL 404, such that the resulting spin hall voltage in the second SHL 404 may be matched to the spin hall voltage of the first SHL 402.

In one embodiment, first SHL 402 and the second SHL 404 each comprises the same material and have the same thickness in the y-direction. In another embodiment, the first SHL 402 and the second SHL 404 comprise different materials have a different thickness in the y-direction. In yet another embodiment, the first SHL 402 and the second SHL 404 comprise the same or different materials and the have the same or different thicknesses in the y-direction. The first and the second SHLs 402, 404 may be formed by a non-magnetic heavy metal material selected from a group that includes Ta, Pt, W, Hf, Bi, and alloys thereof. Additionally, it is to be understood that while Ta, Pt, W, Hf, Bi, and alloys thereof have been exemplified as the materials of the first and the second SHLs 402, 404, other materials are contemplated, and the embodiments discussed herein are not limited. For example, BiSb and BiSe may be used as the material for the first and the second SHLs 402, 404. Furthermore, in one embodiment, the materials of the seed layers 428, 432, the interlayers 424a, 424b, and SHL capping layer 426 are selected to optimize the BiSb based topological material for specific grain orientation with improved spin hall angle for the first and second SHLs 402, 404.

In some embodiments, the first SHL 402 has a crystalline structure of (012), whereas, the second SHL 404 has a crystalline structure of (001). By utilizing BiSb in either the first or second SHLs 402, 404, the induced spin hall voltage can be tuned and matched to the other SHL 402, 404. For example, the first SHL 402 characteristics, such as the crystalline structure of (012), may improve the spin hall angle of the first SHL 402, and the second SHL 404 characteristics, such as the crystalline structure of (001), may improve the spin hall angle of the second SHL 404 in order to match the spin hall voltage output of the first and second SHLs 402, 404. Table 1 below shows the spin hall angle, the conductivity, and the relative power of various compounds that may form a SHL 402, 404.

TABLE 1

|  | Spin Hall angle | Conductivity ($10^{\wedge}6$/ohm/m) | Power (relative) |
| --- | --- | --- | --- |
| Beta-Ta | −0.15 | 0.52 | 1.0E+00 |
| Pt | 0.08 | 4.2 | 4.4E−01 |
| Beta-W | −0.4 | 0.47 | 1.6E−01 |
| Epitaxial Bi2Se3 | 2.5 | 0.055 | 3.4E−02 |
| Non-epitaxial BiSb(001) 10 nm | 11 | 0.25 | 3.9E−04 |
| Epitaxial BiSb (012) 10 nm | 52 | 0.25 | 1.7E−05 |

As shown in Table 1, epitaxial BiSb (012) has a spin hall angle of 52, whereas the epitaxial Bi2Se3 has a spin hall angle of 2.5. Furthermore, the BiSb material (i.e., specifically Sb) may have a tendency to diffuse in the positive y-direction (i.e., from the first SHL 402 to the gap layer 410, or from the second SHL 404 to the second shield 422b) unless a capping layer(s), such as the first interlayer 424a and SHL capping layer 426, are present. By utilizing the epitaxial BiSb (012) as the material of the first SHL 402, the spin hall voltage output of the first SHL 402 may be more easily matched to the spin hall voltage output of the second SHL 404.

Because the BiSb material has a tendency to diffuse in the positive y-direction (i.e., the positive y-direction previously mentioned) when no SHL capping layer is present, such as in the case of the first SHL 402, the spin hall angle of the first SHL 402 may need to be increased in order to compensate for the BiSb diffusion, as BiSb diffusion may result in lower spin hall angles. Thus, to compensate for a lower spin hall angle, the BiSb material used for the first SHL 402 can include an initial spin hall angle that may be relatively large, such as a spin hall angle of about 52 for an epitaxial BiSb (012) material, when compared to the BiSb material used for the second SHL 404, where the second SHL 404 may include a non-epitaxial BiSb (001) material that includes a spin hall angle of about 11. Furthermore, in one embodiment, the materials of the seed layers 428, 432 and the interlayers 424a, 424b are selected to optimize the BiSb based topological material for specific grain orientation with improved spin hall angle for the first and second SHLs 402, 404.

Figure 5:
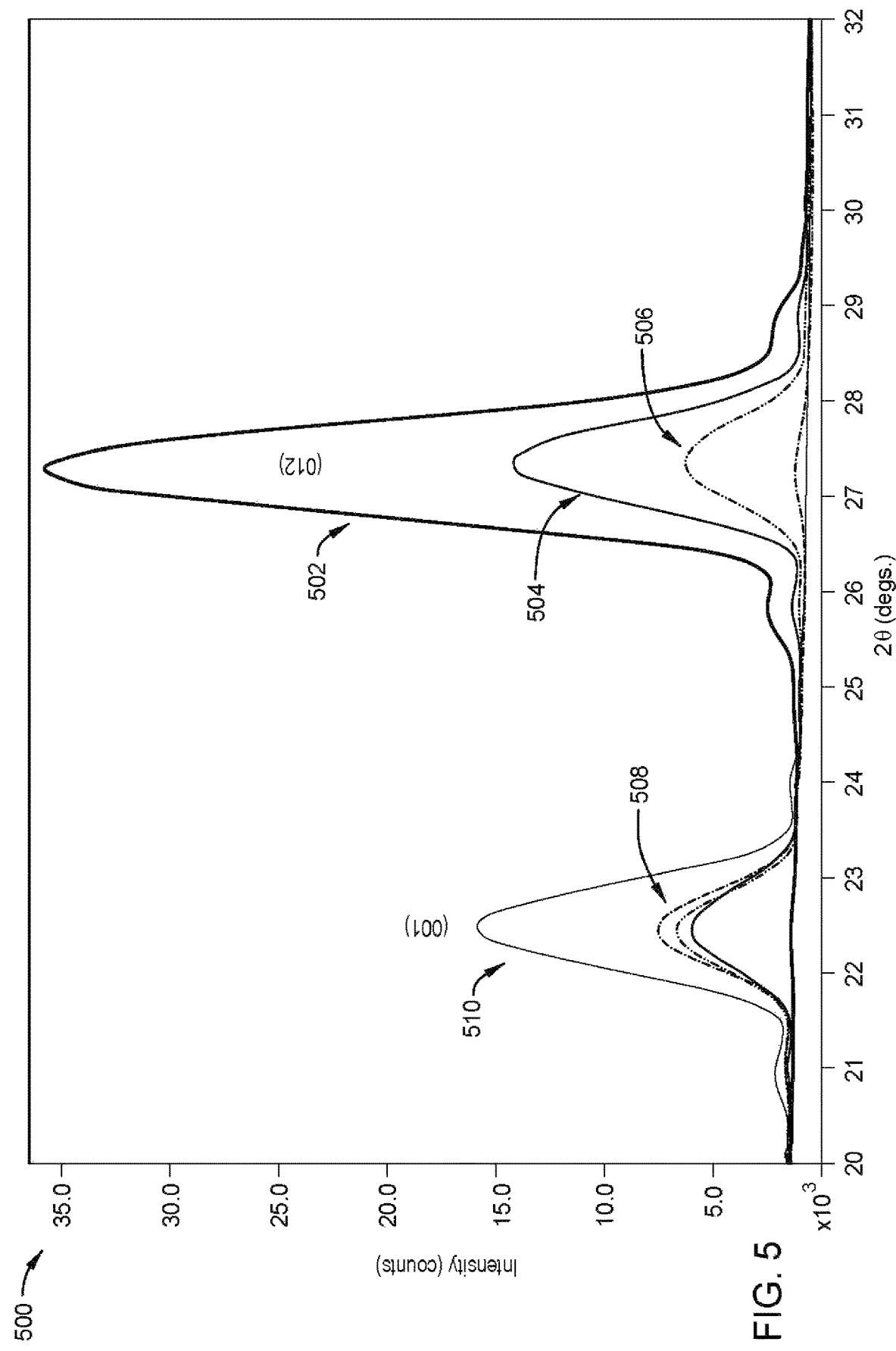
FIGS. 5-10 illustrate graphs of the intensity of the crystalline structure of the SHL, according to various embodiments.

FIG. 5 illustrates a graph 500 of the intensity of the crystalline structure of the SHL, according to one embodiment. For each case shown, the SHL comprises BiSb or a BiSbX alloy, where 'X' represents a possible material such as Cu, and where the SHL has a thickness of about 100 Angstroms. The SHL may be the first SHL 402 or the second SHL 404 of FIG. 4. The seed layer, such as the silicide seed multilayer 428 or the seed layer 432 of FIG. 4, may include several different dimensions and materials. In the descriptions herein, the listed dimensions and materials are not intended to be limiting, but to provide examples of possible embodiments.

Line 502 shows a seed layer, such as the silicide seed multilayer 428 or the seed layer 432 of FIG. 4, comprising a Si/CuAgNi/NiFe/CuAgNi multilayer stack with a BiSbCu SHL. The Si layer may have a thickness of about 16 Angstroms, the first CuAgNi layer may have a thickness of about 1 Angstrom, the NiFe layer may have a thickness of about 8 Angstroms, and the second CuAgNi layer may have a thickness of about 1 Angstrom.

Line 504 shows a seed layer comprising a Si/NiFe/CuAgNi multilayer stack with a BiSb SHL. The Si layer may have a thickness of about 20 Angstroms, the NiFe layer may have a thickness of about 7 Angstroms, and the CuAgNi layer may have a thickness of about 5 Angstroms.

Line 506 shows a seed layer comprising a Si/NiFe/Si/NiFe multilayer stack with a BiSb SHL. The first Si layer may have a thickness of about 20 Angstroms, the first NiFe layer may have a thickness of about 4 Angstroms, the second Si layer may have a thickness of about 8 Angstroms, and the second NiFe layer may have a thickness of about 7 Angstroms.

Line 508 shows a seed layer comprising a NiFe/Si/NiFe/CuAgNi multilayer stack with a BiSb SHL. The first NiFe layer may have a thickness of about 5 Angstroms, the Si layer may have a thickness of about 20 Angstroms, and the second NiFe layer may have a thickness of about 5 Angstroms, and the CuAgNi layer may have a thickness of about 5 Angstroms.

Line 510 shows a seed layer comprising a Si/NiFe/CuAgNi multilayer stack with a BiSb SHL. The Si layer may have a thickness of about 20 Angstroms, the NiFe layer may have a thickness of about 5 Angstroms, and the CuAgNi layer may have a thickness of about 5 Angstroms.

For each seed layer, the resulting crystalline structure of the SHL is graphed, where a higher intensity reflects a higher percentage of that crystalline structure present in the SHL. For example, by appropriately selecting a multilayer seed layer stack, such as Si/CuAgNi/NiFe/CuAgNi, with a SHL comprising BiSbCu, the (012) crystalline structure of the SHL may be amplified and the resulting spin current of the relevant FL may be more easily adjusted, as shown by line 502. Likewise, by including a Si/NiFe/CuAgNi multilayer seed stack with a SHL comprising BiSb, the (001) crystalline structure of the SHL is amplified, as shown by line 510. The Si/NiFe/CuAgNi multilayer seed stack may be utilized for the seed layer 432 of the second section 464 of the SOT differential reader 400 of FIG. 4 to maximize the (001) crystalline structure and to match the spin current of the first section 462 of the SOT differential reader 400 to the second section 464. Moreover, the Si/CuAgNi/NiFe/CuAgNi multilayer seed stack may be utilized for the silicide seed multilayer 428 of the first section 462 of the SOT differential reader 400 of FIG. 4 to maximize the (012) crystalline structure and to match the spin current of the first section 462 of the SOT differential reader 400 to the second section 464.

Figure 6:
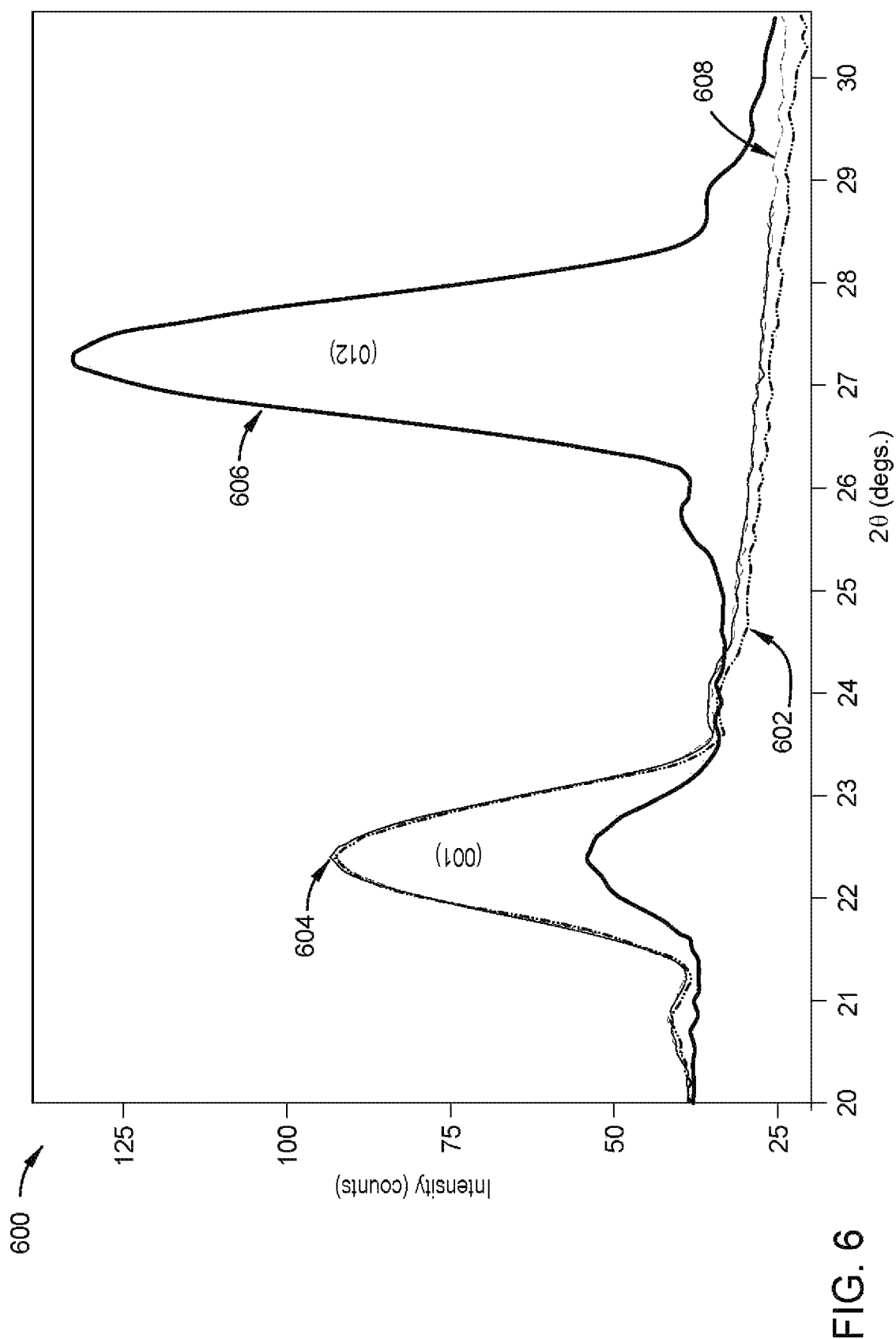

FIG. 6 illustrates a graph 600 of the intensity of the crystalline structure of the SHL, according to another embodiment. For each case, the SHL includes BiSb, where the SHL has a thickness of about 100 Angstroms. The SHL may be the first SHL 402 or the second SHL 404 of FIG. 4. The seed layer, such as the silicide seed multilayer 428 or the seed layer 432 of FIG. 4, may include several different dimensions and materials. For each seed layer, the resulting crystalline structure of the SHL is graphed where a higher intensity reflects a higher percentage of that crystalline structure present in the SHL. In the descriptions herein, the listed dimensions and materials are not intended to be limiting, but to provide examples of possible embodiments.

Line 602 shows a seed layer, such as the silicide seed multilayer 428 or the seed layer 432 of FIG. 4, comprising a Si/NiFe/CuAgNi multilayer stack with a BiSb SHL. The Si layer may have a thickness of about 30 Angstroms, the NiFe layer may have a thickness of about 5 Angstroms, and the CuAgNi layer may have a thickness of about 5 Angstroms.

Line 604 shows a seed layer comprising a Si/NiFe/CuAgNi multilayer stack with a BiSb SHL. The Si layer may have a thickness of about 30 Angstroms, the NiFe layer may have a thickness of about 5 Angstroms, and the CuAgNi layer may have a thickness of about 2 Angstroms.

Line 606 shows s seed layer comprising a Si/NiFe/CuAgNi multilayer stack with a BiSb SHL. The Si layer may have a thickness of about 30 Angstroms, the NiFe layer may have a thickness of about 7 Angstroms, and the CuAgNi layer may have a thickness of about 5 Angstroms.

Line 608 shows a seed layer comprising a Si/NiFe/CuAgNi multilayer stack with a BiSb SHL. The Si layer may have a thickness of about 30 Angstroms, the NiFe layer may have a thickness of about 7 Angstroms, and the CuAgNi layer may have a thickness of about 2 Angstroms.

For example, by appropriately selecting a multilayer seed layer stack, such as Si/NiFe/CuAgNi, where the Si layer has a thickness of about 30 Angstroms, the NiFe layer has a thickness of about 7 Angstroms, and the CuAgNi layer has a thickness of about 5 Angstroms, the (012) crystalline structure of the SHL may be amplified and the resulting spin current of the relevant FL may be more easily adjusted, as shown by line 606. Likewise, by including a Si/NiFe/CuAgNi multilayer seed stack, where the CuX layer has a thickness of between about 2 Angstroms and about 5 Angstroms, where 'X' represents a possible material such as Cu, and the NiFe layer has a thickness of about 5 Angstroms, the (001) crystalline structure of the SHL is amplified, as shown by lines 602, 604, and 608.

Thus, the Si/NiFe/CuAgNi multilayer seed stack may be utilized for the seed layer 432 of the second section 464 of the SOT differential reader 400 of FIG. 4 to maximize the (001) crystalline structure and to match the spin current of the first section 462 of the SOT differential reader 400 to the second section 464. Moreover, the Si/NiFe/CuAgNi multilayer seed stack may be utilized for the silicide seed multilayer 428 of the first section 462 of the SOT differential reader 400 of FIG. 4 to maximize the (012) crystalline structure and to match the spin current of the first section 462 of the SOT differential reader 400 to the second section 464.

Figure 7:
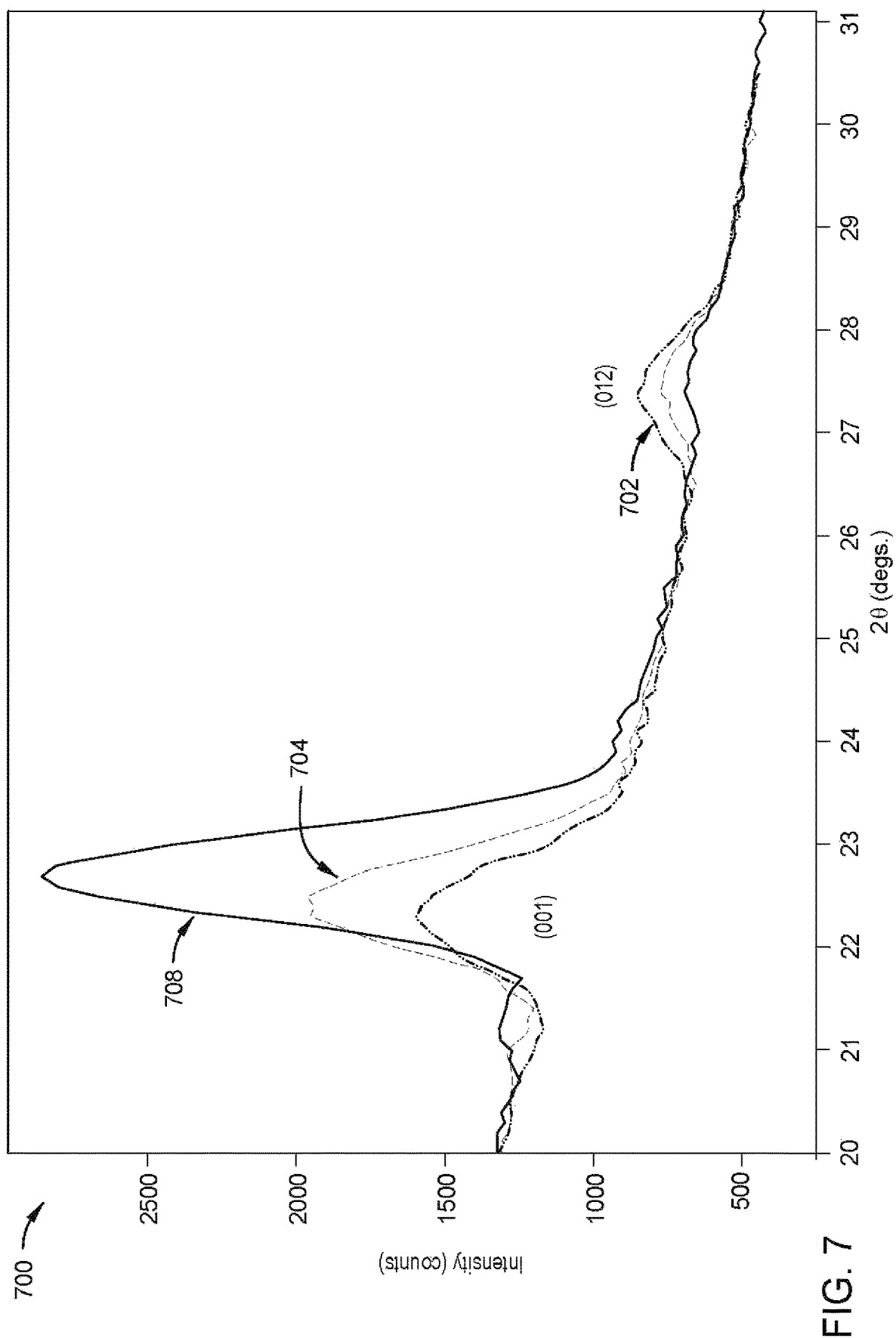

FIG. 7 illustrates a graph 700 of the intensity of the crystalline structure of the SHL, according to another embodiment. For each case, the SHL includes BiSb, where the SHL has a thickness of about 100 Angstroms. Each line 702, 704, 708 illustrates a different Sb concentration percentage in the SHL. For example, line 702 illustrates a 13% Sb concentration, line 704 illustrates a 21% Sb concentration, and line 708 illustrates a 36% Sb concentration. The listed percent concentrations are not intended to be limiting, but to provide examples of possible embodiments.

The SHL may be the first SHL 402 or the second SHL 404 of FIG. 4. The seed layer, such as the silicide seed multilayer 428 or the seed layer 432 of FIG. 4, and/or the interlayers, such as the first interlayer 424a and/or the second interlayer 424b of FIG. 4, may include various different dimensions and materials. As shown by line 708, a higher concentration of Sb in the SHL promotes a (001) crystalline structure. Thus, the second SHL 404 may have a Sb concentration of about 30% to about 40%, such as 36%, and the first SHL 402 may have a Sb concentration of about 7% to about 17%, such as 13%. By including a higher percentage of Sb in the SHL comprising BiSb, the (001) crystalline structure is promoted or increased, as shown by line 708.

Figure 8:
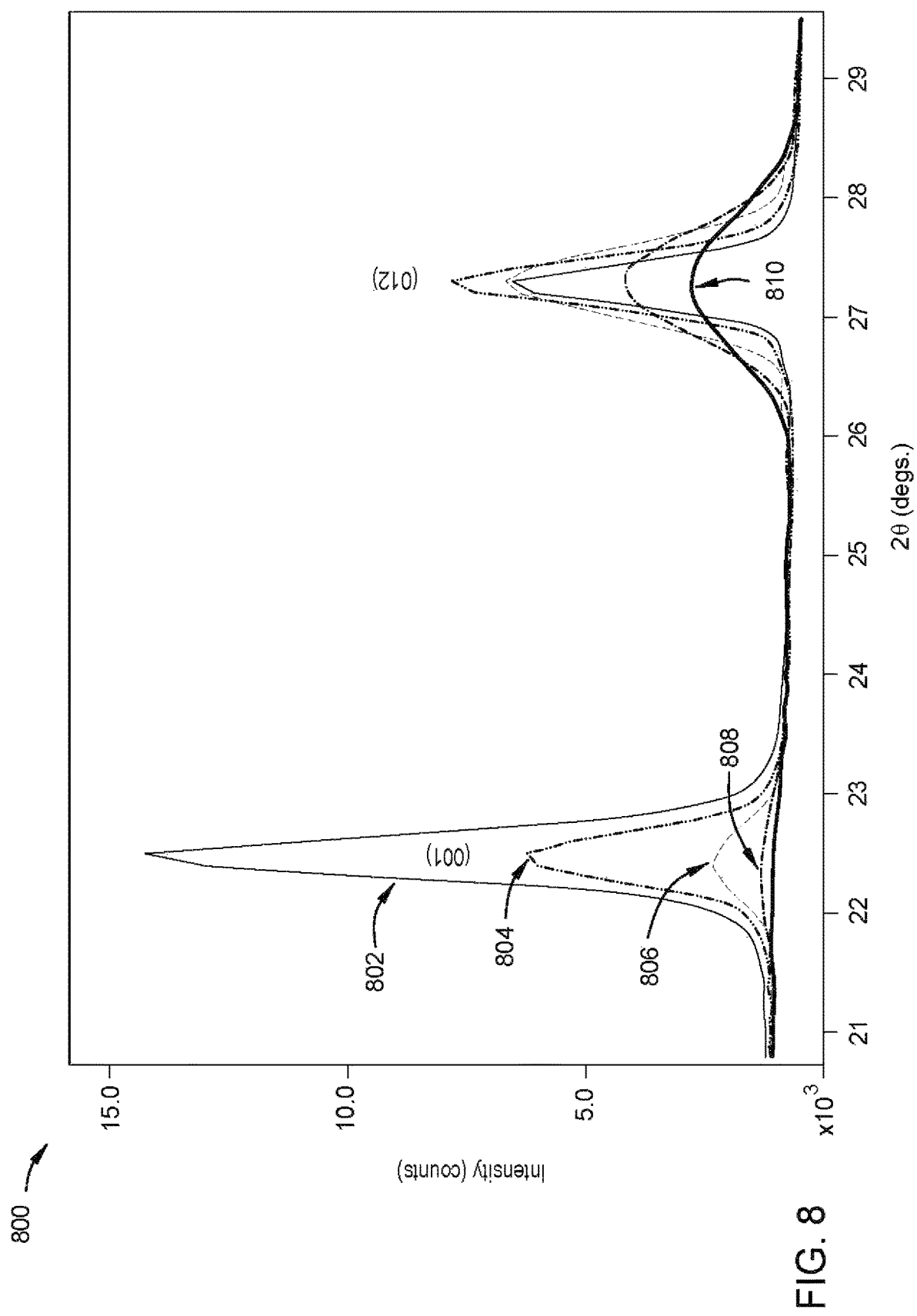

FIG. 8 illustrates a graph 800 of the intensity of the crystalline structure of the SHL, according to another embodiment. For each case, the SHL includes BiSbX, where 'X' represents a possible material such as Cu. Each line 802-810 illustrates a different SHL film thickness. For example, line 802 shows a SHL film thickness of about 466 Angstroms, line 804 shows a SHL film thickness of about 244 Angstroms, line 806 shows a thickness of about 140 Angstroms, line 808 shows a SHL film thickness of about 90 Angstroms, and line 810 shows a thickness of about 61 Angstroms. The listed dimensions are not intended to be limiting, but to provide examples of possible embodiments.

The SHL may be the first SHL 402 or the second SHL 404 of FIG. 4. The seed layer, such as the silicide seed multilayer 428 or the seed layer 432 of FIG. 4, and/or the interlayers, such as the first interlayer 424a and/or the second interlayer 424b of FIG. 4, may include various different dimensions and materials. As shown by line 802, a thicker SHL promotes a (001) crystalline structure. Thus, the second SHL 404 may have thickness of about of about 450 Angstroms to about 470 Angstroms, such as 466 Angstroms, and the first SHL 402 may have a thickness of about 240 Angstroms to about 250 Angstroms, such as about 244 Angstroms. By including a thicker BiSbX SHL film, the (001) crystalline structure is promoted or increased.

Figure 9:
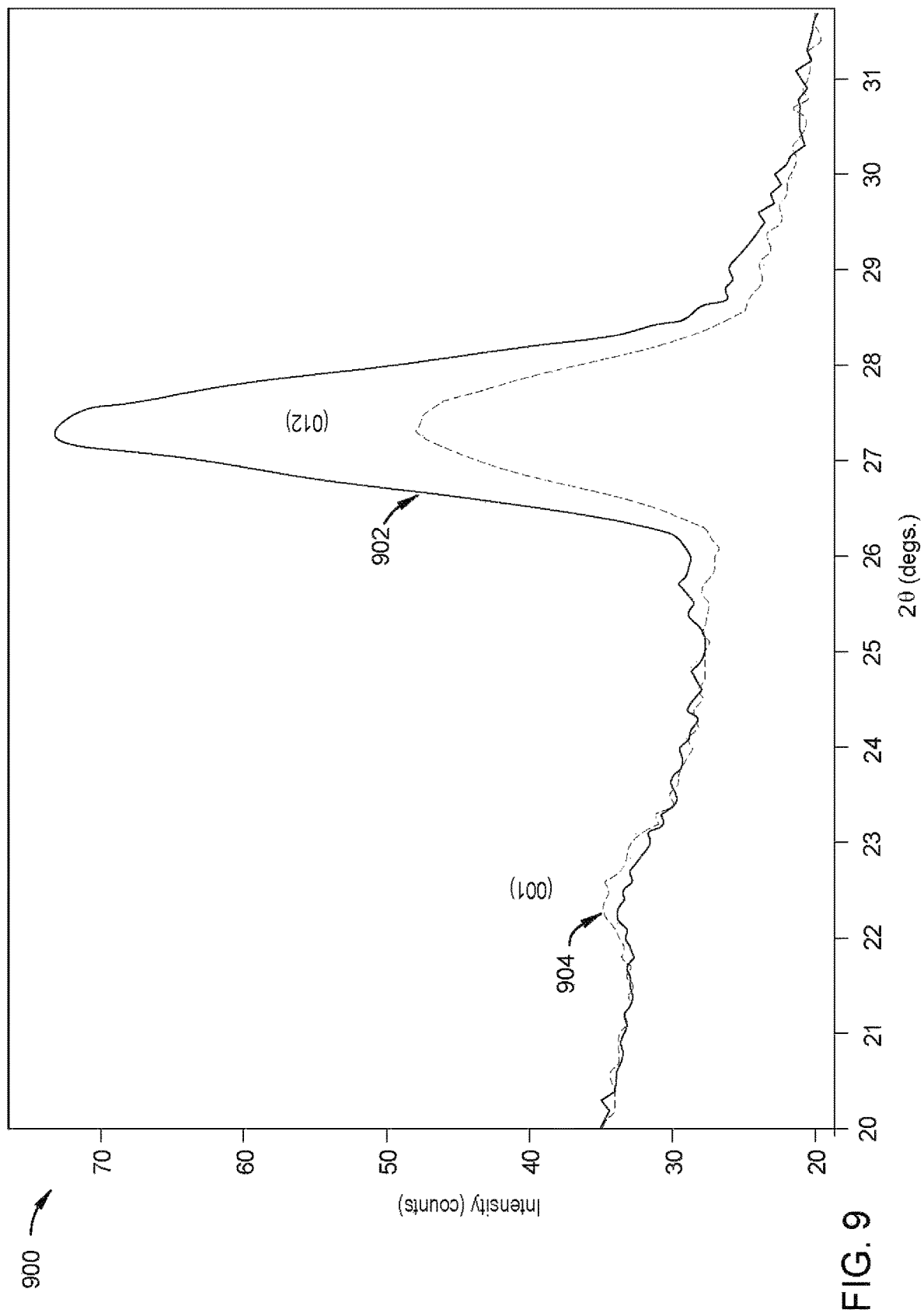

FIG. 9 illustrates a graph 900 of the intensity of the crystalline structure of the SHL, according to another embodiment. For each line 902, 904, the SHL includes BiSb, where the SHL has a thickness of about 100 Angstroms. The SHL may be the first SHL 402 or the second SHL 404 of FIG. 4. Furthermore, by including a NiFeTa as an interlayer, such as the first interlayer 424a and/or the second interlayer 424b of FIG. 4, the resulting intensity of the (012) crystalline structure of the SHL may be increased. For example, line 902 shows an interlayer comprising a NiFeTa layer, where the NiFeTa layer has a thickness of about 20 Angstroms.

Furthermore, by including a NiAl layer as an interlayer, such as the first interlayer 424a and/or the second interlayer 424b of FIG. 4, the resulting intensity of the (001) crystalline structure of the SHL may be increased. For example, line 904 shows an interlayer comprising a NiAl layer, where the NiAl layer has a thickness of about 20 Angstroms. The listed dimensions are not intended to be limiting, but to provide examples of possible embodiments. For each interlayer, the resulting crystalline structure of the SHL is graphed where a higher intensity reflects a higher percentage of that crystalline structure present in the SHL. By including a thin NiAl layer, such as about 20 Angstroms as shown by line 904, the (001) crystalline structure is promoted or increased. However, by including a NiFeTa layer, such as about 20 Angstroms as shown by line 902, the (012) crystalline structure is promoted or increased. Furthermore, by utilizing a NiFeTa layer underneath the NiAl layer, the (001) and the (012) crystalline structures (i.e., texture) of the SHLs may be enhanced.

Moreover, as discussed further below, thin seed layers can also be used to vary the degree of (001) versus (012) texture in the first and second SHLs, providing a better way to tune the SHL properties. For example, a silicide seed multilayer comprising a Si layer having a thickness of about 4 Angstroms to about 8 Angstroms, a NiFe layer having a thickness of about 4 Angstroms, and a CuAgNi layer having a thickness of about 2 Angstroms can be utilized to switch the texture of an SHL from (001) to (012) by changing the thickness of the Si layer. A primarily (001) texture in a SHL results from the Si layer having a thickness of about 8 Angstroms, while a primarily (012) texture in a SHL results from a Si layer having a thickness of about 4 Angstroms.

Figure 10:
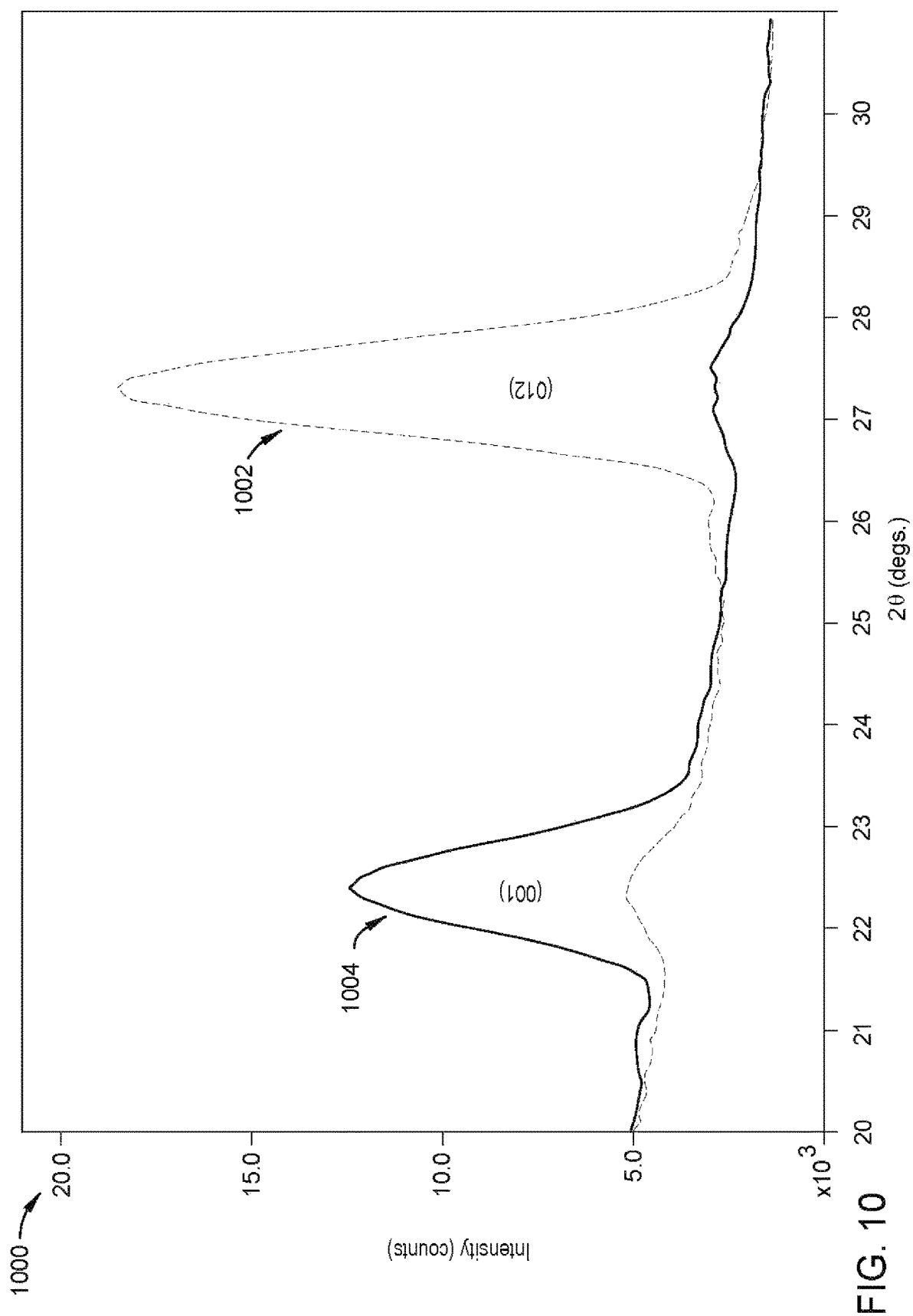

FIG. 10 illustrates a graph 1000 of the intensity of the crystalline structure of the SHL, according to another embodiment. For each line 1002, 1004, the SHL includes BiSb. The graph 1000 illustrates the effect of including various seed layers, specifically adjusting the thickness of the Si layer of the seed layer or the silicide seed multilayer, on the crystalline structure of the SHLs, such as the first SHL 402 or the second SHL 404 of FIG. 4. Line 1002 shows a Si/NiFe/Cu multilayer stack, where the Si layer has a thickness of about 4 Angstroms, the NiFe layer has a thickness of about 4 Angstroms, and the Cu layer has a thickness of about 2 Angstroms. Line 1004 shows a Si/NiFe/Cu multilayer stack, where the Si layer has a thickness of about 8 Angstroms, the NiFe layer has a thickness of about 4 Angstroms, and the Cu layer has a thickness of about 3 Angstroms.

By varying the silicide layer thickness of the seed layer, the crystalline structure (i.e., the texture) of the SHL may be changed from (001) to (012), or vice-versa. For example, by including a thin layer of Si, such as about 4 Angstroms, as shown by line 1002, the (012) crystalline structure of the relevant SHL is promoted or enhanced. Likewise, when increasing the Si layer thickness to about 8 Angstroms, as shown by line 1004, the (001) crystalline structure of the relevant SHL is promoted or enhanced. In some embodiments, by decreasing the thickness of the Si layer, the amount of Si diffusing into the SHL layer decreases, thus resulting in a reduction of interfacial roughness and in an increase of thermal annealing temperature.

By utilizing seed layers and/or interlayers of various materials and dimensions, the SHLs may be tuned and the resulting spin hall voltage converted from the spin current injected from the FLs may be better matched. Selectively choosing the materials and dimensions of the seed layers and interlayers further enables the crystalline structures of the SHLs and the spacing between the SHLs to be chosen, allowing the amplitude of induced spin hall voltage inside the SHLs to be easily matched and/or tuned as needed. Moreover, while the first and second FLs may be independently controlled, utilizing the seed layers and/or interlayers of various materials and dimensions allows the power to each FL to be matched, which further enhances the ability of the SHLs to be tuned and the resulting spin hall voltage converted from spin current injected from the FLs may be better matched. Additionally, the design of the SOT differential reader improves reader resolution without decreasing the shield-to-shield spacing (i.e., read-gap).

It is to be understood that the magnetic recording head (i.e., the magnetic head assembly) discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," application Ser. No. 16/365,034, filed Mar. 31, 2019, assigned to the same assignee of this application. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

In one embodiment, a magnetic recording head comprises a first shield, a second shield, and a spin orbital torque (SOT) differential reader disposed between the first shield and the second shield. The SOT differential reader comprises a silicide seed multilayer disposed over the first shield, a first spin hall effect layer disposed over the silicide seed multilayer, the first spin hall effect layer comprising BiSb or an alloy thereof having a crystalline structure of (012), a first interlayer layer disposed over the first spin hall effect layer, a first free layer disposed over the first interlayer layer, a seed layer disposed over the first free layer, a second free layer disposed over the seed layer, a second interlayer disposed over the second free layer, a second spin hall effect layer disposed over the second interlayer layer, the second spin hall effect layer comprising BiSb or an alloy thereof having a crystalline structure of (001), and a cap layer disposed over the second spin hall effect layer.

The seed layer comprises NiFeTa having a thickness of about 5 Angstroms to about 15 Angstroms. The silicide seed multilayer comprises a Si layer having a thickness of about 16 Angstroms, a first Cu layer having a thickness of about 1 Angstrom, a NiFe layer having a thickness of about 8 Angstroms, and a second Cu layer having a thickness of about 1 Angstrom. The first interlayer comprises a NiCu layer having a thickness of about 2 Angstroms to about 4 Angstroms and a NiFeTa layer having a thickness of about 5 Angstroms to about 15 Angstroms. The second interlayer comprises a NiFeTa layer having a thickness of about 5

Angstroms to about 15 Angstroms and a NiAl layer having a thickness of about 5 Angstroms to about 20 Angstroms.

The first spin hall effect layer has a thickness of about 240 Angstroms to about 250 Angstroms. The second spin hall effect layer has a thickness of about 450 Angstroms to about 470 Angstroms. The cap layer comprises a NiCu layer and a NiFeTa layer. The magnetic recording head is configured to match an amplitude of the first spin hall effect layer to the second spin hall effect layer, and to match a spin current from the first free layer to a spin current from the second free layer. The magnetic recording head further comprises a gap layer disposed between the first free layer and the seed layer. The magnetic recording head further comprises an electrical lead recessed from a media facing surface, the electrical lead being in contact with the gap layer and the second shield, wherein the first free layer, the second free layer, the gap layer, the first spin hall effect layer, and the second spin hall effect layer are disposed at the media facing surface. The second spin hall effect layer has a Sb concentration of about 30% to about 40%, and the first spin hall effect layer has a Sb concentration of about 7% to about 17%.

In another embodiment, a magnetic recording head comprises a first shield, a second shield, and a spin orbital torque (SOT) differential reader disposed between the first shield and the second shield. The SOT differential reader comprises a silicide seed multilayer disposed over the first shield, a first spin hall effect layer disposed over the silicide seed multilayer, the first spin hall effect layer comprising BiSb or an alloy thereof having a crystalline structure of (012), a first interlayer layer disposed over the first spin hall effect layer, the first interlayer comprising a NiCu layer and a NiFeTa layer, a first free layer disposed over the first interlayer layer, a seed layer disposed over the over the first free layer, a second free layer disposed over the seed layer, a second interlayer disposed over the second free layer, the second interlayer comprising a NiFeTa layer and a NiAl layer, and a second spin hall effect layer disposed over the second interlayer layer, the second spin hall effect layer comprising BiSb or an alloy thereof having a crystalline structure of (001).

The magnetic recording head further comprises a cap layer disposed over the second spin hall effect layer, the cap layer comprising a NiCu layer having a thickness of about 5 Angstroms to about 10 Angstroms and a NiFeTa layer having a thickness of about 10 Angstroms to about 20 Angstroms. The magnetic recording head further comprises a gap layer disposed between the first free layer and the seed layer, the gap layer being configured to act as an electrical lead. The silicide seed multilayer comprises a Si layer having a thickness of about 16 Angstroms, a first Cu layer having a thickness of about 1 Angstrom, a NiFe layer having a thickness of about 8 Angstroms, and a second Cu layer having a thickness of about 1 Angstrom. The seed layer comprises NiFeTa having a thickness of about 5 Angstroms to about 15 Angstroms. The NiCu layer of the first interlayer has a thickness of about 2 Angstroms to about 4 Angstroms and the NiFeTa layer of the first interlayer has a thickness of about 5 Angstroms to about 15 Angstroms. The NiFeTa layer of the second interlayer has a thickness of about 5 Angstroms to about 15 Angstroms and the NiAl layer of the second interlayer has a thickness of about 5 Angstroms to about 20 Angstroms. The second spin hall effect layer comprises a higher Sb concentration than the first spin hall effect layer, and the second spin hall effect layer is thicker than the first spin hall effect layer.

In yet another embodiment, a magnetic recording head comprises a first shield, a second shield, and a spin orbital torque (SOT) differential reader disposed between the first shield and the second shield. The SOT differential reader comprises a silicide seed multilayer disposed over the first shield, the silicide seed multilayer comprising a Si layer, a first Cu layer, a NiFe layer, and a second Cu layer, a first spin hall effect layer disposed over the silicide seed multilayer, the first spin hall effect layer comprising BiSb or an alloy thereof having a crystalline structure of (012), a first interlayer disposed over the first spin hall effect layer, the first interlayer comprising a NiCu layer and a NiFeTa layer, a first free layer disposed over the first interlayer layer, a gap layer disposed over the first free layer, a seed layer disposed over the gap layer, the seed layer comprising NiFeTa, a second free layer disposed over the gap layer, a second interlayer disposed over the second free layer, the second interlayer comprising a NiFeTa layer and a NiAl layer, a second spin hall effect layer disposed over the second interlayer layer, the second spin hall effect layer comprising BiSb or an alloy thereof having a crystalline structure of (001), wherein the second spin hall effect layer has a greater thickness and a higher Sb concentration than the first spin hall effect layer, and a cap layer comprising a NiCu layer and a NiFeTa layer disposed over the second spin hall effect layer.

The Si layer of the silicide seed multilayer has a thickness of about 16 Angstroms, the first Cu layer of the silicide seed multilayer has a thickness of about 1 Angstrom, the NiFe layer of the silicide seed multilayer has a thickness of about 8 Angstroms, and the second Cu layer of the silicide seed multilayer has a thickness of about 1 Angstrom. The seed layer has a thickness of about 5 Angstroms to about 15 Angstroms. The NiCu layer of the first interlayer has a thickness of about 2 Angstroms to about 4 Angstroms and the NiFeTa layer of the first interlayer has a thickness of about 5 Angstroms to about 15 Angstroms. The NiFeTa layer of the second interlayer has a thickness of about 5 Angstroms to about 15 Angstroms and the NiAl layer of the second interlayer has a thickness of about 5 Angstroms to about 20 Angstroms.

While the foregoing is directed to embodiments of the present disclosure, other and further embodiments of the disclosure may be devised without departing from the basic scope thereof, and the scope thereof is determined by the claims that follow.

What is claimed is:

1. A magnetic sensor, comprising:
   a spin orbital torque (SOT) element, the SOT element comprising:
   a silicide seed multilayer disposed over a first shield;
   a first spin hall effect layer disposed over the silicide seed multilayer, the first spin hall effect layer comprising BiSb or an alloy thereof having a crystalline structure of (012);
   a first interlayer layer disposed over the first spin hall effect layer;
   a first free layer disposed over the first interlayer layer;
   a seed layer disposed over the first free layer;
   a second free layer disposed over the seed layer;
   a second interlayer disposed over the second free layer;
   a second spin hall effect layer disposed over the second interlayer layer, the second spin hall effect layer comprising BiSb or an alloy thereof having a crystalline structure of (001); and
   a cap layer disposed over the second spin hall effect layer.

2. The magnetic sensor of claim 1, wherein the seed layer comprises NiFeTa having a thickness of about 5 Angstroms to about 15 Angstroms, and wherein the silicide seed multilayer comprises a Si layer having a thickness of about 16 Angstroms, a first Cu layer having a thickness of about 1 Angstrom, a NiFe layer having a thickness of about 8 Angstroms, and a second Cu layer having a thickness of about 1 Angstrom.

3. The magnetic sensor of claim 1, wherein the first interlayer comprises a NiCu layer having a thickness of about 2 Angstroms to about 4 Angstroms and a NiFeTa layer having a thickness of about 5 Angstroms to about 15 Angstroms, and wherein the second interlayer comprises a NiFeTa layer having a thickness of about 5 Angstroms to about 15 Angstroms and a NiAl layer having a thickness of about 5 Angstroms to about 20 Angstroms.

4. The magnetic sensor of claim 1, wherein the first spin hall effect layer has a thickness of about 240 Angstroms to about 250 Angstroms, wherein the second spin hall effect layer has a thickness of about 450 Angstroms to about 470 Angstroms, and wherein the cap layer comprises a NiCu layer and a NiFeTa layer.

5. The magnetic sensor of claim 1, wherein the magnetic recording head is configured to:
  match an amplitude of the first spin hall effect layer to the second spin hall effect layer; and
  match a spin current from the first free layer to a spin current from the second free layer.

6. The magnetic sensor of claim 1, further comprising:
  a gap layer disposed between the first free layer and the seed layer; and
  an electrical lead recessed from a media facing surface, the electrical lead being in contact with the gap layer and a second shield, wherein the first free layer, the second free layer, the gap layer, the first spin hall effect layer, and the second spin hall effect layer are disposed at the media facing surface.

7. The magnetic sensor of claim 1, wherein the second spin hall effect layer has a Sb concentration of about 30% to about 40%, and wherein the first spin hall effect layer has a Sb concentration of about 7% to about 17%.

8. A magnetic recording device comprising the magnetic sensor of claim 1.

9. A magnetic sensor, comprising:
  a spin orbital torque (SOT) element, the SOT element comprising:
    a silicide seed multilayer disposed over a first shield;
    a first spin hall effect layer disposed over the silicide seed multilayer, the first spin hall effect layer comprising BiSb or an alloy thereof having a crystalline structure of (012);
    a first interlayer layer disposed over the first spin hall effect layer, the first interlayer comprising a NiCu layer and a NiFeTa layer;
    a first free layer disposed over the first interlayer layer;
    a seed layer disposed over the first free layer;
    a second free layer disposed over the seed layer;
    a second interlayer disposed over the second free layer, the second interlayer comprising a NiFeTa layer and a NiAl layer; and
    a second spin hall effect layer disposed over the second interlayer layer, the second spin hall effect layer comprising BiSb or an alloy thereof having a crystalline structure of (001).

10. The magnetic sensor of claim 9, further comprising:
  a cap layer disposed over the second spin hall effect layer, the cap layer comprising a NiCu layer having a thickness of about 5 Angstroms to about 10 Angstroms and a NiFeTa layer having a thickness of about 10 Angstroms to about 20 Angstroms; and
  a gap layer disposed between the first free layer and the seed layer, the gap layer being configured to act as an electrical lead.

11. The magnetic sensor of claim 9, wherein the silicide seed multilayer comprises a Si layer having a thickness of about 16 Angstroms, a first Cu layer having a thickness of about 1 Angstrom, a NiFe layer having a thickness of about 8 Angstroms, and a second Cu layer having a thickness of about 1 Angstrom, and wherein the seed layer comprises NiFeTa having a thickness of about 5 Angstroms to about 15 Angstroms.

12. The magnetic sensor of claim 9, wherein the NiCu layer of the first interlayer has a thickness of about 2 Angstroms to about 4 Angstroms and the NiFeTa layer of the first interlayer has a thickness of about 5 Angstroms to about 15 Angstroms, and wherein the NiFeTa layer of the second interlayer has a thickness of about 5 Angstroms to about 15 Angstroms and the NiAl layer of the second interlayer has a thickness of about 5 Angstroms to about 20 Angstroms.

13. The magnetic sensor of claim 9, wherein the second spin hall effect layer comprises a higher Sb concentration than the first spin hall effect layer, and wherein the second spin hall effect layer is thicker than the first spin hall effect layer.

14. A magnetic recording device comprising the magnetic sensor of claim 9.

15. A magnetic sensor, comprising:
  a spin orbital torque (SOT) element, the SOT element comprising:
    a silicide seed multilayer disposed over a first shield, the silicide seed multilayer comprising a Si layer, a first Cu layer, a NiFe layer, and a second Cu layer;
    a first spin hall effect layer disposed over the silicide seed multilayer, the first spin hall effect layer comprising BiSb or an alloy thereof having a crystalline structure of (012);
    a first interlayer layer disposed over the first spin hall effect layer, the first interlayer comprising a NiCu layer and a NiFeTa layer;
    a first free layer disposed over the first interlayer layer;
    a gap layer disposed over the first free layer;
    a seed layer disposed over the gap layer, the seed layer comprising NiFeTa;
    a second free layer disposed over the gap layer;
    a second interlayer disposed over the second free layer, the second interlayer comprising a NiFeTa layer and a NiAl layer;
    a second spin hall effect layer disposed over the second interlayer layer, the second spin hall effect layer comprising BiSb or an alloy thereof having a crystalline structure of (001), wherein the second spin hall effect layer has a greater thickness and a higher Sb concentration than the first spin hall effect layer; and
    a cap layer comprising a NiCu layer and a NiFeTa layer disposed over the second spin hall effect layer.

16. The magnetic sensor of claim 15, wherein the Si layer of the silicide seed multilayer has a thickness of about 16 Angstroms, the first Cu layer of the silicide seed multilayer has a thickness of about 1 Angstrom, the NiFe layer of the silicide seed multilayer has a thickness of about 8 Angstroms, and the second Cu layer of the silicide seed multilayer has a thickness of about 1 Angstrom.

17. The magnetic sensor of claim 15, wherein the seed layer has a thickness of about 5 Angstroms to about 15 Angstroms.

18. The magnetic sensor of claim 15, wherein the NiCu layer of the first interlayer has a thickness of about 2 Angstroms to about 4 Angstroms and the NiFeTa layer of the first interlayer has a thickness of about 5 Angstroms to about 15 Angstroms.

19. The magnetic sensor of claim 15, wherein the NiFeTa layer of the second interlayer has a thickness of about 5 Angstroms to about 15 Angstroms and the NiAl layer of the second interlayer has a thickness of about 5 Angstroms to about 20 Angstroms.

20. A magnetic recording device comprising the magnetic sensor of claim 15.

* * * * *